(12) United States Patent
Hagiwara

(10) Patent No.: US 11,628,827 B2
(45) Date of Patent: Apr. 18, 2023

(54) VEHICLE CONTROL DEVICE AND CONTROL METHOD

(71) Applicant: DENSO TEN Limited, Kobe (JP)

(72) Inventor: Masatoshi Hagiwara, Kobe (JP)

(73) Assignee: DENSO TEN Limited, Kobe (JP)

(*) Notice: Subject to any disclaimer, the term of this patent is extended or adjusted under 35 U.S.C. 154(b) by 93 days.

(21) Appl. No.: 17/204,321

(22) Filed: Mar. 17, 2021

(65) Prior Publication Data

US 2022/0227354 A1 Jul. 21, 2022

(30) Foreign Application Priority Data

Jan. 19, 2021 (JP) .............................. JP2021-006630
Jan. 19, 2021 (JP) .............................. JP2021-006741

(51) Int. Cl.
*B60W 30/045* (2012.01)
*B60W 10/20* (2006.01)
*B60W 10/18* (2012.01)
*B60W 10/08* (2006.01)

(52) U.S. Cl.
CPC .......... *B60W 30/045* (2013.01); *B60W 10/08* (2013.01); *B60W 10/18* (2013.01); *B60W 10/20* (2013.01)

(58) Field of Classification Search
CPC .... B60W 30/045; B60W 10/08; B60W 10/18; B60W 10/20

USPC .......................................................... 701/22
See application file for complete search history.

(56) References Cited

U.S. PATENT DOCUMENTS

| 5,376,868 A | * | 12/1994 | Toyoda | B60L 3/0023 318/587 |
| 6,089,680 A | * | 7/2000 | Yoshioka | B60T 8/1755 303/146 |
| 2016/0194002 A1 | * | 7/2016 | Kelly | B60W 10/184 701/93 |
| 2017/0166203 A1 | * | 6/2017 | Sugai | B60T 8/17 |
| 2018/0297585 A1 | * | 10/2018 | Lian | B60T 8/17552 |
| 2021/0269030 A1 | * | 9/2021 | Uemura | B60W 10/04 |
| 2022/0080838 A1 | * | 3/2022 | Hwang | B60K 1/00 |

FOREIGN PATENT DOCUMENTS

| JP | H05-328542 A | 12/1993 |
| JP | 2004-066873 A | 3/2004 |

* cited by examiner

*Primary Examiner* — Yi-Kai Wang
(74) *Attorney, Agent, or Firm* — Oliff PLC

(57) ABSTRACT

A vehicle control device configured to control a vehicle configured to rotate each of four or more drive wheels by each of different motors, includes a motor control unit configured to control torques that are generated by the motors, and when oversteer has occurred during turning of the vehicle, the motor control unit performs a control upon oversteer, and when understeer has occurred during turning of the vehicle, the motor control unit performs a control upon understeer.

25 Claims, 15 Drawing Sheets

VEHICLE CONTROL DEVICE AND CONTROL METHOD

CROSS-REFERENCE TO RELATED APPLICATIONS

This application is based on and claims priority under 35 USC 119 from Japanese Patent Application No. 2021-006630 filed on Jan. 19, 2021 and Japanese Patent Application No. 2021-006741 filed on Jan. 19, 2021.

TECHNICAL FIELD

The present invention relates to a vehicle control device and a control method.

BACKGROUND ART

A vehicle that can generate a braking force on each of four wheels and generates a braking force on a predetermined wheel when an actual turning radius (turning line) deviates from a targeted turning radius (turning line) during turning is conventionally known (for example, refer to JP-A-2004-066873).

SUMMARY OF INVENTION

However, the technology disclosed in JP-A-2004-066873 has room for improvement in returning the vehicle to the targeted turning line at an early stage.

The present invention has been made in view of the above situations and is to provide a vehicle control device and a control method capable of returning a vehicle to a targeted turning line at an early stage when the vehicle deviates from the targeted turning line.

A vehicle control device of an aspect of the embodiment is configured to control a vehicle configured to rotate each of four or more drive wheels by each of different motors. The vehicle control device includes a motor control unit configured to control torques that are generated by the motors. When oversteer occurs during turning of the vehicle, the motor control unit performs a control upon oversteer of causing the motor configured to rotate a front wheel on an outer side with respect to the turning to generate braking torque and increasing drive torque of the motor configured to rotate a rear wheel on an inner side with respect to the turning.

A vehicle control device of an aspect of the embodiment is configured to control a vehicle configured to rotate each of four or more drive wheels by each of different motors. The vehicle control device includes a motor control unit configured to control torques that are generated by the motors. When understeer occurs during turning of the vehicle, the motor control unit performs a control upon understeer of causing the motor configured to rotate a rear wheel on an inner side with respect to the turning to generate braking torque and increasing drive torque of the motor configured to rotate a front wheel on an outer side with respect to the turning.

According to the present invention, when the vehicle deviates a targeted turning line, it is possible to return the vehicle to the targeted turning line at an early stage.

DETAILED DESCRIPTION OF THE INVENTION

First Aspect of Present Invention

Hereinafter, a vehicle control device and a control method of an embodiment of a first aspect of the present invention will be described in detail with reference to the accompanying drawings. Note that, the present invention is not limited to the present embodiment.

Figure 1A:
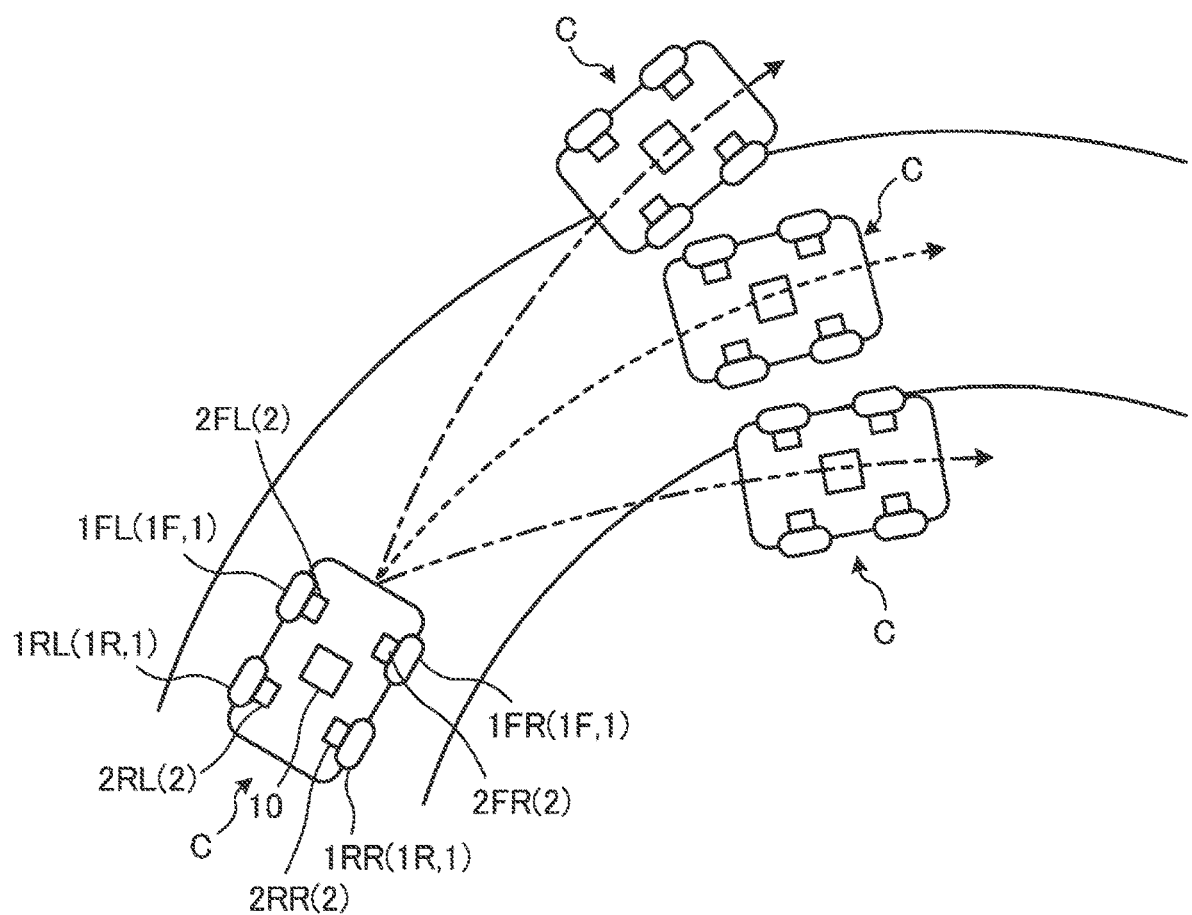
FIG. 1A depicts a turning course of a vehicle.
Figure 1B:
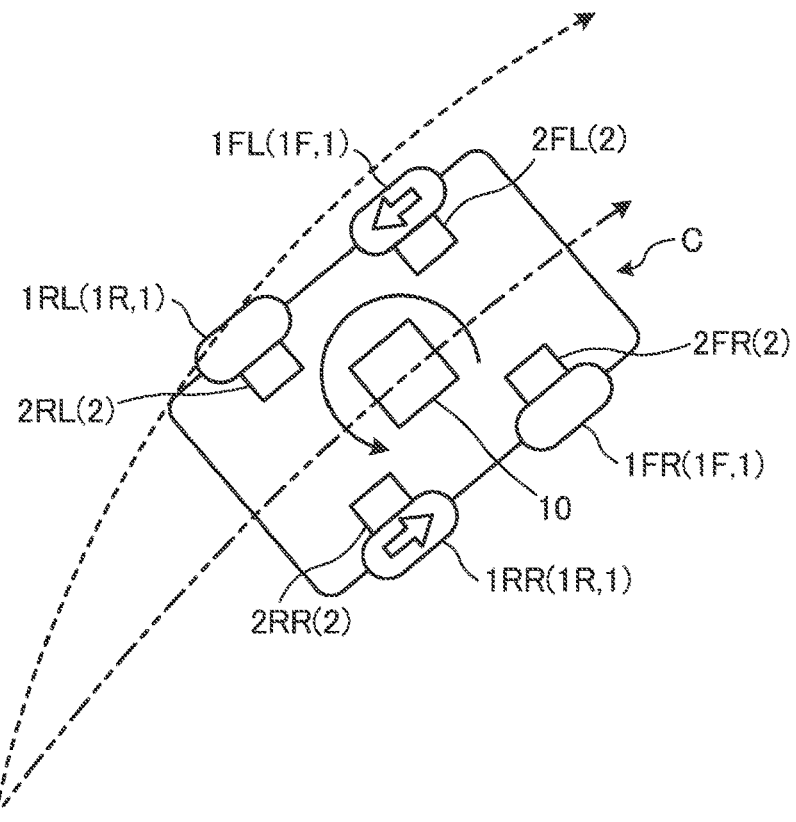
FIG. 1B depicts a control method that is performed when oversteer occurs.
Figure 1C:
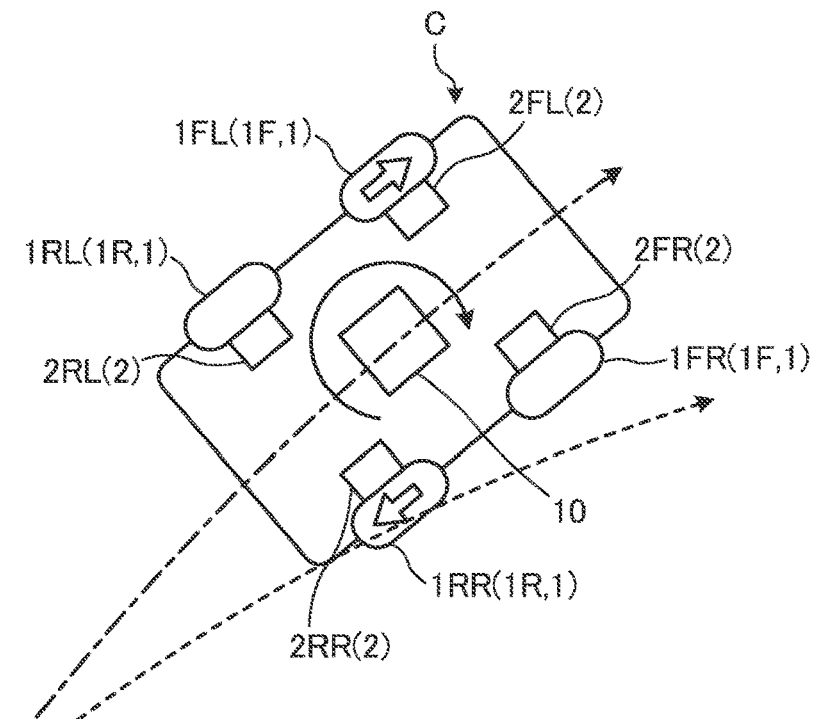
FIG. 1C depicts a control method that is performed when understeer occurs.

A control method of the embodiment is described with reference to FIGS. 1A to 1C. FIG. 1A depicts a turning course of a vehicle C. FIG. 1B depicts a control method that is performed when oversteer occurs. FIG. 1C depicts a control method that is performed when understeer occurs.

The control method of the embodiment is executed by a control device 10 (vehicle control device). The control device 10 is mounted on a vehicle C. The vehicle C has, for example, four drive wheels 1. Note that, the vehicle C may have four or more drive wheels 1. The vehicle C is configured to rotate each of the drive wheels 1 by each of different motors 2. The motor 2 is a so-called in-wheel motor.

In the below, the vehicle C having the four drive wheels 1 is described as an example. The left front drive wheel 1 of the vehicle C is referred to as "left front wheel 1FL", the right front drive wheel 1 of the vehicle C is referred to as "right front wheel 1FR", the left rear drive wheel 1 of the vehicle C is referred to as "left rear wheel 1RL" and the right rear drive wheel 1 of the vehicle C is referred to as "right rear wheel 1RR", in some cases. The motor 2 configured to rotate the left front wheel 1FL is referred to as "motor 2FL for the left front wheel", the motor 2 configured to rotate the right front wheel 1FR is referred to as "motor 2FR for the right front wheel", the motor 2 configured to rotate the left rear wheel 1RL is referred to as "motor 2RL for the left rear wheel" and the motor 2 configured to rotate the right rear wheel 1RR is referred to as "motor 2RR for the right rear wheel", in some cases. The front drive wheels 1 of the vehicle C are also referred to as "front wheels 1F" and the rear drive wheels 1 of the vehicle C are also referred to as "rear wheels 1R", in some cases.

When the vehicle C turns based on a steering angle, the vehicle C preferably turns along a predetermined turning course corresponding to the steering angle, as shown with an arrow of the broken line, without causing sideslip on the vehicle C. If sideslip occurs on the vehicle C, the vehicle C may be oversteered or understeered.

The oversteer indicates a state where the vehicle C travels on a course on a more inner side of a turning radius than a predetermined turning course, as shown with an arrow of the dashed-two dotted line. The oversteer is caused when sideslip occurs on the rear wheels 1R, for example.

The understeer indicates a state where the vehicle C travels on a course on an outermore side of the turning radius than the predetermined turning course, as shown with an arrow of the dashed-dotted line. The understeer is caused when sideslip occurs on the front wheels 1F, for example.

The control method of the embodiment controls torques of the motors 2 to suppress sideslip when the sideslip occurs during turning of the vehicle C.

When the oversteer occurs, the control device 10 causes the motor 2 configured to rotate the front wheel 1F on an outer side with respect to the turning to generate braking torque, as shown in FIG. 1B. The braking torque is torque for generating a braking force on the drive wheel 1. The braking torque is negative torque. The control device 10 increases drive torque of the motor 2 configured to rotate the rear wheel 1R on an inner side with respect to the turning. The drive torque is torque for generating a drive force on the drive wheel 1. The drive torque is positive torque.

For example, when the vehicle C turns right, the control device 10 causes the motor 2FL for the left front wheel to generate the braking torque and increases the drive torque of the motor 2RR for the right rear wheel.

Thereby, the yaw moment in a counterclockwise direction occurs on the vehicle C, so that the vehicle C turns while coming close to the predetermined turning course.

When the understeer occurs, the control device 10 causes the motor 2 configured to rotate the rear wheel 1R on an inner side with respect to the turning to generate braking torque, as shown in FIG. 1C. The control device 10 increases drive torque of the motor 2 configured to rotate the front wheel 1F on an outer side with respect to the turning.

For example, when the vehicle C turns right, the control device 10 causes the motor 2RR for the right rear wheel to generate the braking torque and increases the drive torque of the motor 2FL for the left front wheel.

Thereby, the yaw moment in a clockwise direction occurs on the vehicle C, so that the vehicle C turns while coming close to the predetermined turning course.

In this way, when the oversteer or the understeer occurs, the control device 10 controls the torques of the motors 2 configured to rotate the drive wheels 1, thereby suppressing the oversteer or the understeer. For this reason, the control device 10 can return the vehicle C to the predetermined turning course at an early stage.

Note that, a vehicle C having more than four drive wheels 1 is provided with three or more drive wheels 1 so as to be arranged in a front and rear direction on one side of the vehicle C in a right and left direction, for example. The plurality of drive wheels 1 may be arranged in the right and left direction on one side of the vehicle C in the right and left direction. A drive wheel may also be further provided near a center of the vehicle C.

In this case, for example, the control device 10 is configured to control only two torques of torque of the outermost and forefront front wheel 1F and torque of the innermost and rearmost rear wheel 1R. For example, the control device 10 is also configured to control torques of the drive wheels 1 other than the outermost and rearmost rear wheel 1R and the innermost and forefront front wheel 1F. For example, the control device 10 is also configured to divide the wheels into four groups of a right front group, a left front group, a right rear group and a left rear group by dividing the wheels into the front wheels and the rear wheels depending on whether the wheels are in front of or at the rear of a center of the vehicle C and dividing the wheels into the left wheels and the right wheels depending on whether the wheels are at the left or at the right of a center of the vehicle C, and to control torque of the drive wheel 1 belonging to each group (for example, in a case of controlling the front wheel on an outer side, when the outer side is a right wheel-side, the control device 10 controls the drive wheel 1 belonging to the right front group, as an outer front wheel group).

Figure 2:
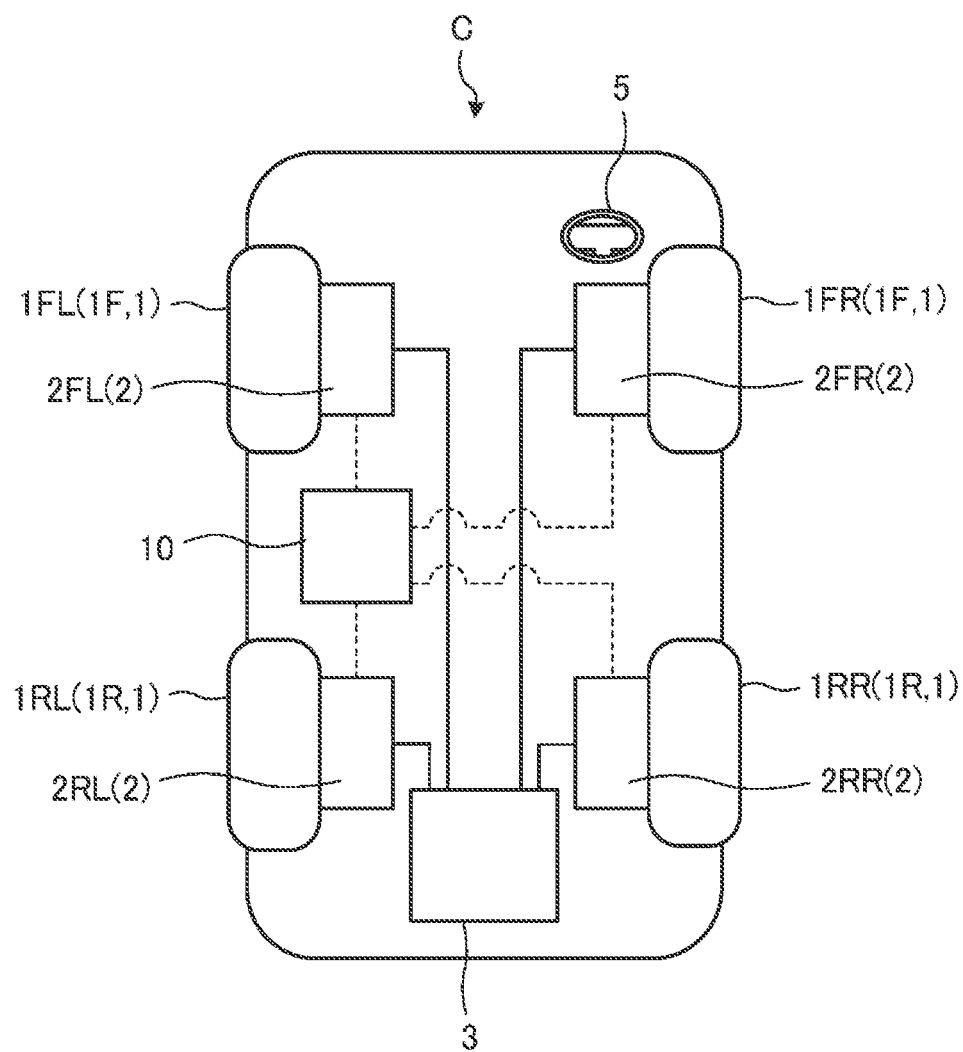
FIG. 2 is a schematic view illustrating a part of a vehicle of an embodiment of a first aspect of the present invention.

Subsequently, the vehicle C of the embodiment is described with reference to FIG. 2. FIG. 2 is a schematic view illustrating a part of the vehicle C of the embodiment.

The vehicle C includes four drive wheels 1, four motors 2, a battery 3 and a control device 10.

The four drive wheels 1 include a left front wheel 1FL, a right front wheel 1FR, a left rear wheel 1RL and a right rear wheel 1RR. When a turning request is made to the vehicle C, for example, when a steering 5 is operated by a driver, the left front wheel 1FL and the right front wheel 1FR are steered in a turning direction. That is, the left front wheel 1FL and the right front wheel 1FR are steered wheels. Note that, the steered wheels may be the left rear wheel 1RL and the right rear wheel 1RR.

The four motors 2 include a motor 2FL for the left front wheel, a motor 2FR for the right front wheel, a motor 2RL for the left rear wheel and a motor 2RR for the right rear wheel.

Each of the motors 2 is attached to each of the different drive wheels 1. Each of the motors 2 is supplied with electric power from the battery 3. The torque of each of the motors 2 is controlled based on a control signal input from the control device 10. Specifically, each of the motors 2 is configured to generate drive torque or braking torque, based on the control signal. The torque generated by each of the motors 2 is transmitted to each of the drive wheels 1.

The control device 10 is a controller configured to individually control each of the motors 2. The control device 10 is configured to output a control signal to each of the motors 2 and to control each of the motors 2, according to an operating amount of an accelerator pedal, an operating amount of a brake pedal or the like, for example.

For example, when the accelerator pedal is operated and an acceleration request is thus made to the vehicle C, the control device 10 controls each of the motors 2 so that drive torque for accelerating the vehicle C is output from each of the motors 2 to each of the drive wheels 1. Thereby, the vehicle C performs acceleration traveling.

In addition, for example, when the brake pedal is operated and a deceleration request is thus made to the vehicle C, the control device 10 controls each of the motors 2 so that the braking torque for decelerating the vehicle C is output from each of the motors 2 to each of the drive wheels 1. Thereby, the vehicle C performs deceleration traveling. Note that, when the deceleration request is made to the vehicle C, the vehicle C may perform the deceleration traveling by using a mechanical brake.

In addition, for example, when the steering 5 is operated and a turning request is thus made to the vehicle C, the control device 10 steers the left front wheel 1FL and the right front wheel 1FR, as described above. When sideslip occurs on the vehicle C during turning, the control device 10 executes sideslip suppression processing. The sideslip suppression processing will be described later.

Figure 3:
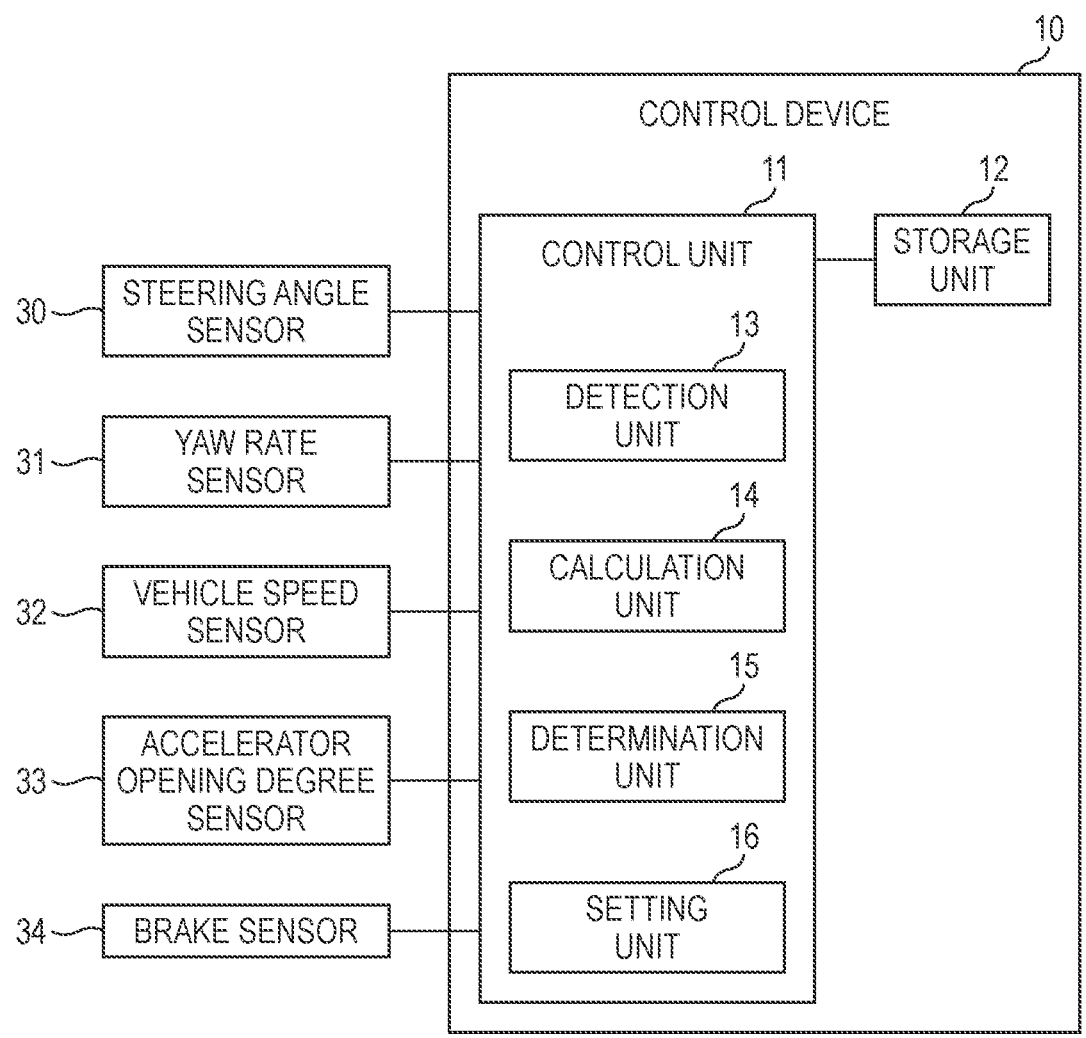
FIG. 3 is a block diagram depicting a configuration of a control device of the embodiment of the first aspect of the present invention.

Subsequently, a configuration of the control device 10 of the embodiment is described with reference to FIG. 3. FIG. 3 is a block diagram depicting a configuration of the control device 10 of the embodiment. Note that, in FIG. 3, only constitutional elements necessary to describe features of the present embodiment are shown by functional blocks and general constitutional elements are not shown.

In other words, each constitutional element shown in FIG. 3 is a functional concept and is not necessarily required to be physically configured as shown. For example, a specific form of distribution/integration of functional blocks is not limited to the shown form and some or all thereof may be functionally or physically distributed/integrated in arbitrary units according to various loads, use situations and the like.

The control device 10 includes a control unit 11 (motor control unit) and a storage unit 12. The storage unit 12 is constituted by a storage device such as a non-volatile memory, a data flash, a hard disk drive and the like, for example. In the storage unit 12, map information, diverse programs and the like are stored.

The control unit 11 includes a detection unit 13, a calculation unit 14, a determination unit 15 and a setting unit 16. The control unit 11 includes a computer or diverse circuits having a CPU, a ROM (Read Only Memory), a RAM (Random Access Memory), a hard disk drive, input/output ports and the like, for example.

The CPU of the computer is configured to function as the detection unit 13, the calculation unit 14, the determination unit 15 and the setting unit 16 of the control unit 11 by reading and executing a program stored in the ROM, for example.

At least some or all of the detection unit 13, the calculation unit 14, the determination unit 15 and the setting unit 16 of the control unit 11 may be constituted by hardware such as ASIC (Application Specific Integrated Circuit) and FPGA (Field Programmable Gate Array).

The detection unit 13 is input with signals from diverse sensors provided to the vehicle C. The diverse sensors include steering angle sensors 30, a yaw rate sensor 31, a vehicle speed sensor 32, an accelerator opening degree sensor 33, a brake sensor 34 and the like.

The detection unit 13 is configured to detect a steering angle θ of the steered wheel, based on a signal input from the steering angle sensor 30. The steering angle sensor 30 is provided to each of the left front wheel 1FL and the right front wheel 1FR. That is, the detection unit 13 is configured to detect each of a steering angle θ of the left front wheel 1FL and a steering angle θ of the right front wheel 1FR. Note that, in descriptions below, a steering angle of the front wheel 1F on an inner side during turning may also be denoted as "θ1" and as steering angle of the front wheel 1F on an outer side during turning may also be denoted as "θ2".

The detection unit 13 is configured to detect a current yaw rate Yawreal (hereinafter, referred to as "real yaw rate Yawreal") of the vehicle C, based on a signal input from the yaw rate sensor 31.

The detection unit 13 is configured to detect a vehicle speed Spd, based on a signal input from the vehicle speed sensor 32. The detection unit 13 is configured to detect an accelerator opening degree Accel, which is a depression amount of an accelerator pedal, based on a signal input from the accelerator opening degree sensor 33.

The detection unit 13 is configured to detect a depression amount of a brake pedal, based on a signal input from the brake sensor 34.

Figure 4:
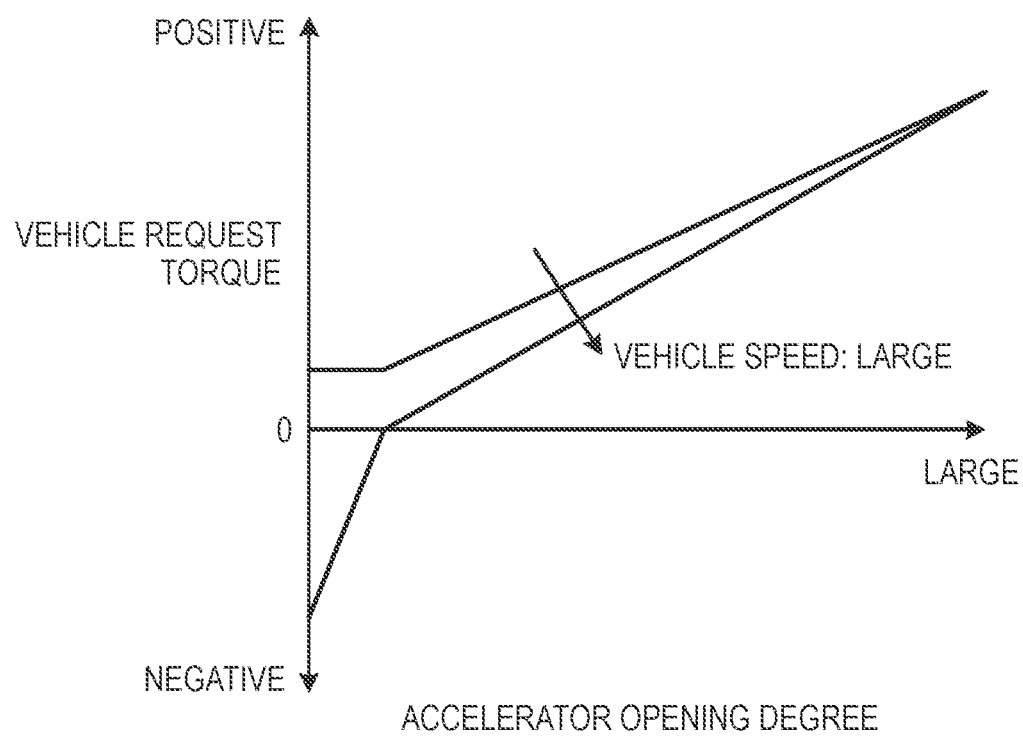
FIG. 4 is a map for calculating vehicle request torque.

The calculation unit 14 is configured to calculate a vehicle request torque Cartrq. The calculation unit 14 is configured to calculate the vehicle request torque Cartrq from a map shown in FIG. 4, based on the vehicle speed Spd and the accelerator opening degree Accel. FIG. 4 depicts a map for calculating the vehicle request torque Cartrq. The calculation unit 14 may also be configured to calculate the vehicle request torque Cartrq from a calculation equation or the like, without using the map. In descriptions below, similarly, the calculation using the map may also be calculation by a calculation equation or the like.

The calculation unit 14 is configured to calculate an estimated turning radius Rad. The calculation unit 14 is configured to calculate the estimated turning radius Rad by using an equation (1), based on a wheelbase L, the steering angle θ1 of the front wheel 1F on an inner side during turning and the steering angle θ2 of the front wheel 1F on an outer side during turning.

$$Rad=(L/\sin θ1+L/\tan θ2)/2 \qquad (1)$$

The calculation unit 14 is configured to calculate a target yaw rate Yawtag. The calculation unit 14 is configured to calculate the target yaw rate Yawtag, based on the vehicle speed Spd and the estimated turning radius Rad. The calculation unit 14 is configured to calculate the target yaw rate Yawtag by using an equation (2).

$$Yawtag=Spd^2/Rad \qquad (2)$$

The calculation unit 14 is configured to calculate a yaw rate deviation Delyaw. The calculation unit 14 is configured to calculate a deviation between the target yaw rate Yawtag and the real yaw rate Yawreal, as the yaw rate deviation Delyaw.

The determination unit 15 is configured to determine whether the brake pedal is depressed and a brake operation is thus performed by a driver. Specifically, the determination unit 15 is configured to determine whether a depression amount of the brake pedal is larger than a predetermined depression amount. When it is determined that the depression amount of the brake pedal is larger than the predetermined depression amount, the determination unit 15 determines that a brake operation is performed by a driver. The predetermined depression amount is a depression amount at which a braking force is generated on the vehicle C.

The determination unit 15 is configured to determine whether understeer has occurred. Specifically, the determination unit 15 is configured to compare the yaw rate deviation Delyaw and a value obtained by multiplying the target yaw rate Yawtag by an understeer determination coefficient Usgain.

When the yaw rate deviation Delyaw is greater than the value obtained by multiplying the target yaw rate Yawtag by the understeer determination coefficient Usgain, the determination unit 15 determines that new understeer has occurred. In other words, when the real yaw rate Yawreal is sufficiently smaller than the target yaw rate Yawtag, the determination unit 15 determines that new understeer has occurred. The understeer determination coefficient Usgain is a predetermined value and is a value at which the vehicle C can determine that new understeer has occurred with respect to a turning line according to the target yaw rate Yawtag.

When the yaw rate deviation Delyaw is equal to or smaller than the value obtained by multiplying the target yaw rate Yawtag by the understeer determination coefficient Usgain, the determination unit 15 determines that new understeer has not occurred. When the yaw rate deviation Delyaw is equal to or smaller than the value obtained by multiplying the target yaw rate Yawtag by the understeer determination coefficient Usgain, the determination unit 15 determines that the understeer has not occurred or the understeer is occurring.

Note that, even though the understeer is occurring, when the yaw rate deviation Delyaw becomes larger than the value obtained by multiplying the target yaw rate Yawtag by the understeer determination coefficient Usgain, the determination unit 15 determines that new understeer has occurred.

The determination unit 15 is configured to determine whether the oversteer has occurred. Specifically, the determination unit 15 compares the yaw rate deviation Delyaw and a value obtained by multiplying the target yaw rate Yawtag by an oversteer determination coefficient Osgain.

When the yaw rate deviation Delyaw is smaller than the value obtained by multiplying the target yaw rate Yawtag by the oversteer determination coefficient Osgain, the determination unit 15 determines that new oversteer has occurred. In other words, when the real yaw rate Yawreal is sufficiently larger than the target yaw rate Yawtag, the determination unit 15 determines that new oversteer has occurred. The oversteer determination coefficient Osgain is a predetermined value and is a value at which the vehicle C can determine that new oversteer has occurred with respect to a turning line according to the target yaw rate Yawtag.

When the yaw rate deviation Delyaw is equal to or larger than the value obtained by multiplying the target yaw rate Yawtag by the oversteer determination coefficient Osgain, the determination unit 15 determines that new oversteer has not occurred. When the yaw rate deviation Delyaw is equal to or larger than the value obtained by multiplying the target yaw rate Yawtag by the oversteer determination coefficient Osgain, the determination unit 15 determines that the oversteer has not occurred or the oversteer is occurring.

Note that, even though the oversteer is occurring, when the yaw rate deviation Delyaw becomes smaller than the value obtained by multiplying the target yaw rate Yawtag by the oversteer determination coefficient Osgain, the determination unit 15 determines that new oversteer has occurred.

The determination unit 15 is configured to determine whether the understeer is occurring. Specifically, the determination unit 15 is configured to determine whether an understeer flag Usfrg is "ON". When the understeer flag Usfrg is "ON", the determination unit 15 determines that the understeer is occurring.

The determination unit 15 is configured to determine whether the oversteer is occurring. Specifically, the determination unit 15 is configured to determine whether an oversteer flag Osfrg is "ON". When the oversteer flag Osfrg is "ON", the determination unit 15 determines that the oversteer is occurring.

When the understeer is occurring, the determination unit 15 determines whether an understeer return condition is satisfied. Specifically, when the yaw rate deviation Delyaw is equal to or smaller than a predetermined threshold value and/or when the brake operation is performed, the determination unit 15 determines that the understeer return condition is satisfied. The predetermined threshold value is a value obtained by multiplying the target yaw rate Yawtag by an understeer convergence determination coefficient Usfingain. The understeer convergence determination coefficient Usfingain is a predetermined value and is a value at which it is possible to determine that the understeer has converged. When the understeer has occurred and a control upon understeer (which will be described later) is executed, the determination unit 15 determines whether to end the control upon understeer, based on a deviation between the target yaw rate Yawtag and the real yaw rate Yawreal.

When the oversteer has occurred, the determination unit 15 determines whether an oversteer return condition is satisfied. Specifically, when a sign of the real yaw rate Yawreal is inverted and/or when the brake operation is performed, the determination unit 15 determines that the oversteer return condition is satisfied. The sign of the real yaw rate Yawreal is a sign indicative of a plus or minus of a sensor value of the yaw rate sensor 31. The inversion of the sign of the real yaw rate Yawreal indicates that an occurrence direction of the real yaw rate Yawreal is inverted. For example, when a multiplied value of a real yaw rate Yawreal detected based on a signal output from the yaw rate sensor 31 and a real yaw rate Yawreal before a predetermined time (for example, previous detection) is a negative value, the determination unit 15 determines that the sign of the real yaw rate Yawreal has been inverted. When the oversteer has occurred and a control upon oversteer (which will be described later) is executed, the determination unit 15 determines whether to end the control upon oversteer, based on the occurrence direction of the real yaw rate Yawreal.

When the oversteer has occurred, the determination unit 15 determines whether a counter operation has been executed by the driver. The counter operation indicates that the steering 5 operated to turn the vehicle C in the turning direction is operated to rotate in an opposite direction. When a direction of the real yaw rate Yawreal and a direction of the steering angle θ of the front wheels 1F are opposite to each other, the determination unit 15 determines that the counter operation has been executed.

For example, in the example of FIG. 1B, when the real yaw rate Yawreal indicates a right turning state and the steering angle θ of the front wheels 1F is a leftward steering, the determination unit 15 determines that the counter operation has been executed.

When it is determined by the determination unit 15 that the understeer has occurred, the setting unit 16 sets the understeer flag Usfrg to "ON". Note that, when setting the understeer flag Usfrg to "ON", if the oversteer flag Osfrg is in an "ON" state, the setting unit 16 sets the oversteer flag Osfrg to "OFF".

When it is determined by the determination unit 15 that the oversteer has occurred, the setting unit 16 sets the oversteer flag Osfrg to "ON". Note that, when setting the oversteer flag Osfrg to "ON", if the understeer flag Usfrg is in an "ON" state, the setting unit 16 sets the understeer flag Usfrg to "OFF".

When it is determined by the determination unit 15 that the understeer return condition is satisfied while the understeer is occurring, the setting unit 16 sets the understeer flag Usfrg to "OFF". When it is determined by the determination unit 15 that the oversteer return condition is satisfied while the oversteer is occurring, the setting unit 16 sets the oversteer flag Osfrg to "OFF".

The setting unit 16 is configured to set torque that is generated by each of the motors 2. When the understeer or the oversteer does not occur, specifically, when the understeer flag Usfrg is "OFF" and the oversteer flag Osfrg is "OFF", the setting unit 16 performs a usual control. When the understeer and the oversteer do not occur, the setting unit 16 sets the torque of each of the motors 2 to usual torque. The setting unit 16 is configured to divide the vehicle request torque Cartrq by the number of the motors 2 and to set the divided value as the usual torque of each of the motors 2. For example, the setting unit 16 sets torque obtained by quadrisecting the vehicle request torque Cartrq as the usual torque of each of the motors 2. The usual torque is positive torque and is drive torque.

For example, when the understeer or the oversteer is occurring and the brake operation is performed by the driver, the setting unit 16 executes the usual control. That is, when the understeer or the oversteer is occurring and the brake operation is performed by the driver, the setting unit 16 returns the control to the usual control. The setting unit 16 is configured to set the usual torque so that the vehicle request torque is generated by the four drive wheels 1.

When the understeer is occurring, the setting unit 16 executes control upon understeer. When the understeer is occurring, the setting unit 16 sets the torque of each of the motors 2 to understeer torque. The setting unit 16 is configured to set the braking torque and the drive torque so that the yaw rate deviation Delyaw becomes small.

Figure 5:
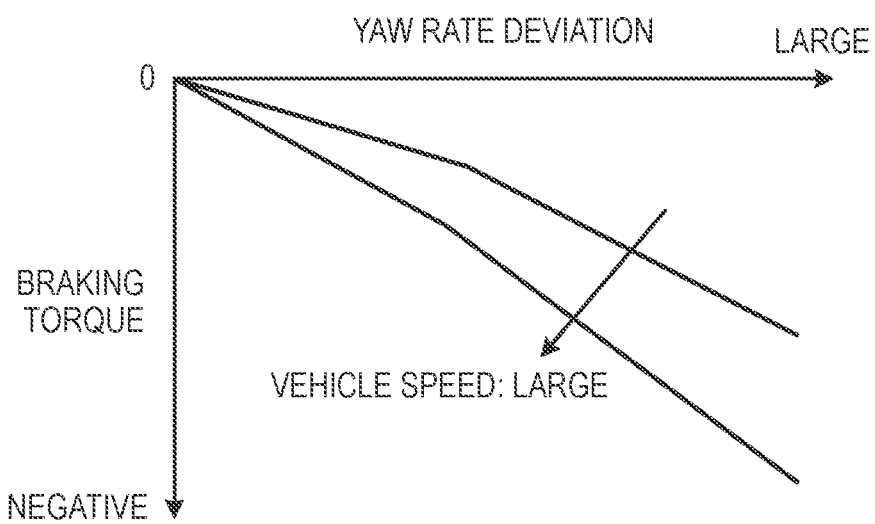
FIG. 5 is a map for calculating braking torque that is generated when understeer occurs.

Specifically, the setting unit 16 is configured to calculate braking torque from a map shown in FIG. 5, based on the yaw rate deviation Delyaw and the vehicle speed Spd, and to set the calculated braking torque as understeer torque of the motor 2 configured to rotate the rear wheel 1R on an inner side with respect to the turning. FIG. 5 depicts a map for calculating the braking torque that is generated when the understeer is occurring.

Figure 6:
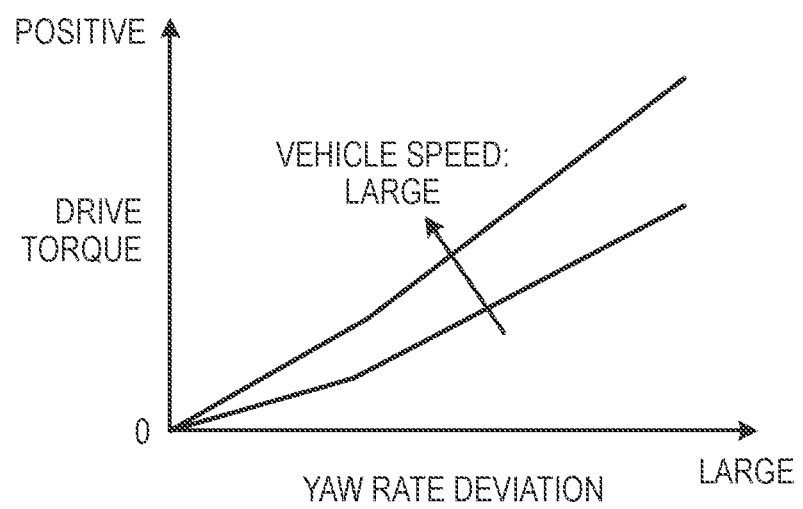
FIG. 6 is a map for calculating drive torque that is generated when understeer occurs.

The setting unit 16 is configured to calculate drive torque from a map shown in FIG. 6, based on the yaw rate deviation Delyaw and the vehicle speed Spd, and to set the calculated drive torque as understeer torque of the motor 2 configured to rotate the front wheel 1F on an outer side with respect to the turning. FIG. 6 depicts a map for calculating the drive torque that is generated when the understeer is occurring.

The setting unit 16 is configured to set the braking torque and the drive torque, based on the vehicle speed Spd. Thereby, for example, when the vehicle speed Spd is large, the braking torque and the drive torque are generated so as to return at an early stage by the predetermined turning course. Also, for example, when the vehicle speed Spd is small, the braking torque and the drive torque are generated so that an occupant's posture does not change rapidly. That is, the control device 10 can generate the braking torque and the drive torque according to a traveling state of the vehicle C.

Note that, in a case where the vehicle C has more than four drive wheels 1 and there is a plurality of drive wheels 1 to which the braking torque is applied, the setting unit 16 is configured to equally divide the braking torque, and to set the braking torque on each of the drive wheels 1 so that the braking torque is equally applied to the plurality of drive wheels 1. In a case where there is a plurality of drive wheels 1 to which the drive torque is applied, the setting unit 16 is configured to equally divide the drive torque, and to set the drive torque on each of the drive wheels 1 so that the drive torque is equally applied to the plurality of drive wheels 1. When applying the braking torque or the drive torque to the plurality of drive wheels 1, the setting unit 16 may distribute the braking torque to be applied to each of the drive wheels 1 or the drive torque to be applied to each of the drive wheels 1 so that a ratio in the drive wheel 1 having a higher applying effect is larger. For example, when applying the drive torque to a plurality of left front wheels 1FL, the setting unit 16 sets the drive torque of each of the left front wheels 1FL so that a ratio of the drive torque, which is applied to a further left and front wheel of the plurality of left front wheels 1FL, is larger than the other left front wheels 1FL.

When the understeer has occurred, the setting unit 16 sets torques of the motor 2 configured to rotate the front wheel 1F on an inner side with respect to the turning and the motor 2 configured to rotate the rear wheel 1R on an outer side with respect to the turning to zero. That is, the understeer torques of the motor 2 configured to rotate the front wheel 1F on an inner side with respect to the turning and the motor 2 configured to rotate the rear wheel 1R on an outer side with respect to the turning are zero. For this reason, the torque is not transmitted from the motors 2 to the front wheel 1F on an inner side with respect to the turning and the rear wheel 1R on an outer side with respect to the turning.

When the understeer has occurred, the torques of the motor 2 configured to rotate the front wheel 1F on an inner side with respect to the turning and the motor 2 configured to rotate the rear wheel 1R on an outer side with respect to the turning are set to zero. For this reason, when the understeer has occurred, the drive torque of the motor 2 configured to rotate the front wheel 1F on an outer side with respect to the turning is increased so as to suppress rapid change in vehicle speed Spd of the vehicle C.

For example, when the vehicle C turns right and the understeer has occurred, the setting unit 16 causes the motor 2RR for the right rear wheel configured to rotate the right rear wheel 1RR to generate the braking torque and increases the drive torque of the motor 2FL for the left front wheel configured to rotate the left front wheel 1FL. The setting unit 16 sets the torques of the motor 2RL for the left rear wheel configured to rotate the left rear wheel 1RL and the motor 2FR for the right front wheel configured to rotate the right front wheel 1FR to zero.

When the vehicle C turns left and the understeer has occurred, the setting unit 16 causes the motor 2RL for the left rear wheel configured to rotate the left rear wheel 1RL to generate the braking torque and increases the drive torque of the motor 2FR for the right front wheel configured to rotate the right front wheel 1FR. The setting unit 16 sets the torques of the motor 2RR for the right rear wheel configured to rotate the right rear wheel 1RR and the motor 2FL for the left front wheel configured to rotate the left front wheel 1FL to zero.

Note that, the setting unit 16 may be configured to generate slight braking torque without setting the torque of the motor 2 configured to rotate the front wheel 1F on an inner side with respect to the turning to zero. The setting unit 16 may be configured to generate slight drive torque without setting the torque of the motor 2 configured to rotate the rear wheel 1R on an outer side with respect to the turning to zero. That is, when the understeer has occurred, the setting unit 16 reduces the torques of the motor 2 configured to rotate the front wheel 1F on an inner side with respect to the turning and the motor 2 configured to rotate the rear wheel 1R on an outer side with respect to the turning, as compared to the usual torques. At this time, the setting unit 16 may set each torque so that the torque to be increased and the torque to be decreased become zero when subtracted.

When a summed torque of the drive torque and the braking torque calculated as the understeer torque is greater than the vehicle request torque Cartrq, the setting unit 16 limits the drive torque. That is, the setting unit 16 sets so that the braking torque is applied preferentially to the drive torque. Specifically, the setting unit 16 limits the drive torque so that the summed torque of the drive torque and the braking torque becomes the vehicle request torque Cartrq, without changing the braking torque. That is, when the understeer is occurring, an upper limit torque of the drive torque of the motor 2 configured to rotate the front wheel 1F on an outer side with respect to the turning becomes a torque obtained by adding the braking torque to the vehicle request torque Cartrq.

When the oversteer has occurred and the counter operation is not performed, the setting unit 16 performs a control upon oversteer. When the oversteer is occurring, the setting unit 16 sets the torque of each of the motors 2 to oversteer torque.

Specifically, the setting unit 16 is configured to set a predetermined braking torque, as the oversteer torque of the motor 2 configured to rotate the front wheel 1F on an outer side with respect to the turning. The setting unit 16 is also configured to set a predetermined drive torque, as the oversteer torque of the motor 2 configured to rotate the rear wheel 1R on an inner side with respect to the turning. The predetermined braking torque and the predetermined drive torque are each a predetermined value. The predetermined braking torque and the predetermined drive torque are values set so that the sign of the real yaw rate Yawreal is inverted and the vehicle C returns to the predetermined turning line. Note that, the predetermined braking torque and the predetermined drive torque may also be calculated from a map or the like, based on the yaw rate deviation Delyaw, and the vehicle speed Spd.

When the oversteer has occurred and the counter operation is not performed, the setting unit 16 also sets the torques of the motor 2 configured to rotate the front wheel 1F on an inner side with respect to the turning and the motor 2 configured to rotate the rear wheel 1R on an outer side with respect to the turning to zero. That is, the oversteer torques of the motor 2 configured to rotate the front wheel 1F on an inner side with respect to the turning and the motor 2 configured to rotate the rear wheel 1R on an outer side with respect to the turning are zero. For this reason, the torque is not transmitted from the motors 2 to the front wheel 1F on an inner side with respect to the turning and the rear wheel 1R on an outer side with respect to the turning.

When the oversteer has occurred and the counter operation is not performed, the torques of the motor 2 configured to rotate the front wheel 1F on an inner side with respect to the turning and the motor 2 configured to rotate the rear wheel 1R on an outer side with respect to the turning are set to zero. For this reason, when the oversteer has occurred and the counter operation is not performed, the drive torque (oversteer torque) of the motor 2 configured to rotate the rear wheel 1R on an inner side with respect to the turning is increased so as to suppress the rapid change in vehicle speed Spd of the vehicle C.

For example, when the vehicle C turns right, the oversteer has occurred and the counter operation is not performed, the setting unit 16 causes the motor 2FL for the left front wheel configured to rotate the left front wheel 1FL to generate the braking torque and increases the drive torque of the motor 2RR for the right rear wheel configured to rotate the right rear wheel 1RR. The setting unit 16 also sets the torques of the motor 2FR for the right front wheel configured to rotate the right front wheel 1FR and the motor 2RL for the left rear wheel configured to rotate the left rear wheel 1RL to zero.

When the vehicle C turns left, the oversteer has occurred and the counter operation is not performed, the setting unit 16 causes the motor 2FR for the right front wheel configured to rotate the right front wheel 1FR to generate the braking torque and increases the torque of the motor 2RL for the left rear wheel configured to rotate the left rear wheel 1RL. The setting unit 16 also sets the torques of the motor 2FL for the left front wheel configured to rotate the left front wheel 1FL and the motor 2RR for the right rear wheel configured to rotate the right rear wheel 1RR to zero.

Note that, the setting unit 16 may also be configured to generate slight drive torque without setting the torque of the motor 2 configured to rotate the front wheel 1F on an inner side with respect to the turning to zero. The setting unit 16 may also be configured to generate slight braking torque without setting the torque of the motor 2 configured to rotate the rear wheel 1R on an outer side with respect to the turning to zero. That is, when the oversteer has occurred and the counter operation is not performed, the setting unit 16 reduces the torques of the motor 2 configured to rotate the front wheel 1F on an inner side with respect to the turning and the motor 2 configured to rotate the rear wheel 1R on an outer side with respect to the turning, as compared to the usual torques. At this time, the setting unit 16 may set each torque so that the torque to be increased and the torque to be decreased become zero when subtracted.

When a summed torque of the predetermined braking torque and the predetermined braking torque is greater than the vehicle request torque Cartrq, the setting unit 16 limits the drive torque. That is, the setting unit 16 sets so that the braking torque is applied preferentially to the drive torque. In this case, the setting unit 16 limits the drive torque so that the summed torque of the predetermined braking torque and the predetermined drive torque becomes the vehicle request torque Cartrq, without changing the predetermined braking torque. That is, when the oversteer has occurred and the counter operation is not performed, an upper limit torque of the drive torque of the motor 2 configured to rotate the rear wheel 1R on an inner side with respect to the turning becomes a torque obtained by adding the predetermined braking torque to the vehicle request torque Cartrq.

When the oversteer has occurred and the counter operation is performed, the setting unit 16 performs a control upon counter operation. The setting unit 16 is configured to set the torque of each of the motors 2 to counter torque.

Specifically, the setting unit 16 is configured to set the torque of each of the motors 2 so that the vehicle request torque Cartrq is generated by the motors 2 configured to rotate the front wheels 1F, which are steered wheels. For example, the setting unit 16 is configured to set a half torque of the vehicle request torque Cartrq in each of the motor 2FL for the left front wheel configured to rotate the left front wheel 1FL and the motor 2FR for the right front wheel configured to rotate the right front wheel 1FR, as the counter torque. The setting unit 16 is also configured to set the torques of the motor 2RL for the left rear wheel configured to rotate the left rear wheel 1RL and the motor 2RR for the right rear wheel configured to rotate the right rear wheel 1RR to zero. That is, when the oversteer has occurred and the counter operation is performed, the setting unit 16 reduces the braking torque of the motor 2 configured to rotate the front wheel 1F on an outer side with respect to the turning. When the oversteer has occurred and the counter operation is performed, the setting unit 16 generates the drive torques preferentially by the motors 2 configured to rotate the front wheels 1F that are steered wheels.

A control signal for controlling each of the motors 2 is output to each of the motors so that the torque set by the setting unit 16 is generated in each of the motors 2. Thereby, the torque that is generated by each of the motors 2 is controlled.

Figure 7A:
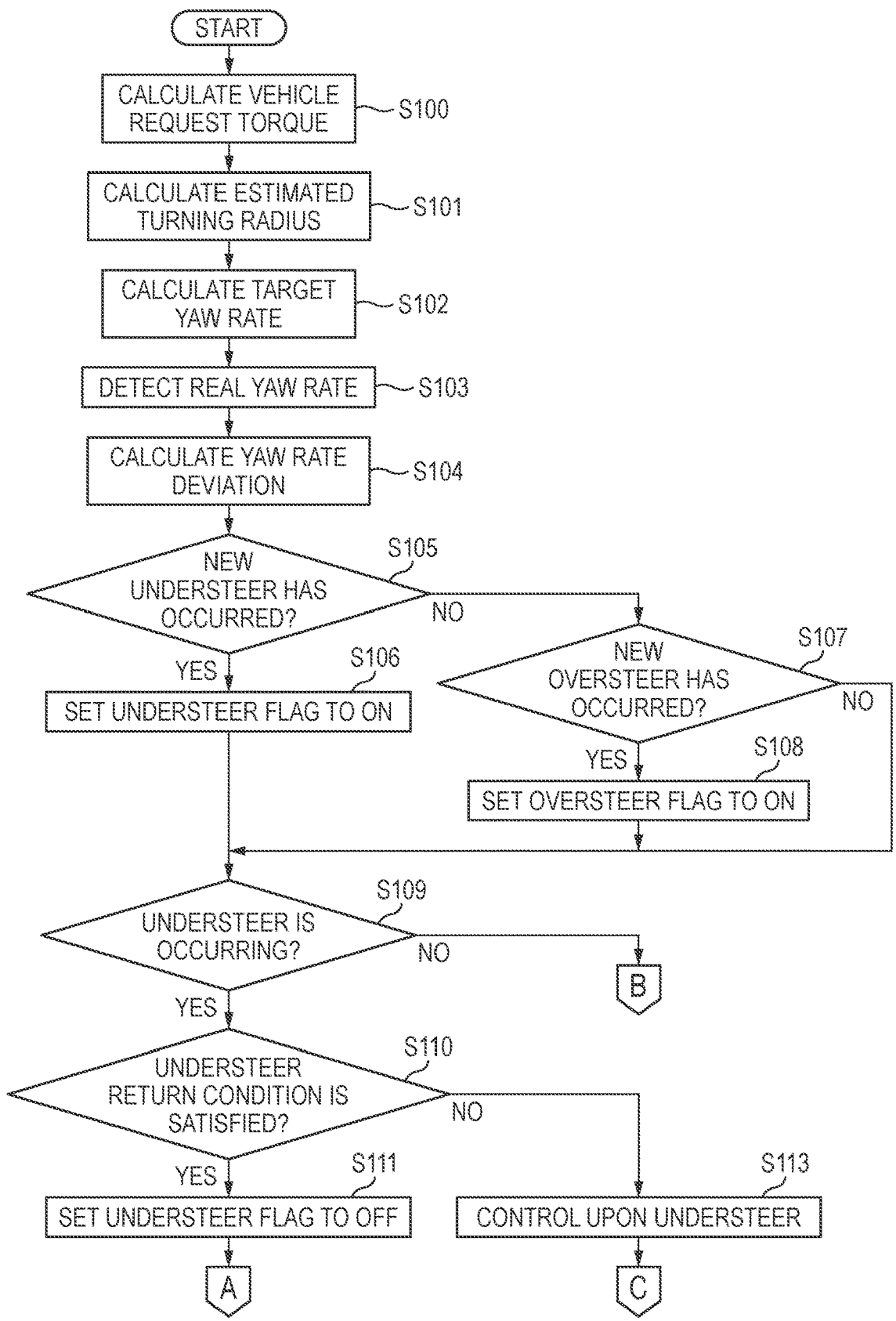
FIG. 7A is a flowchart for illustrating sideslip suppression processing of the embodiment of the first aspect of the present invention.
Figure 7B:
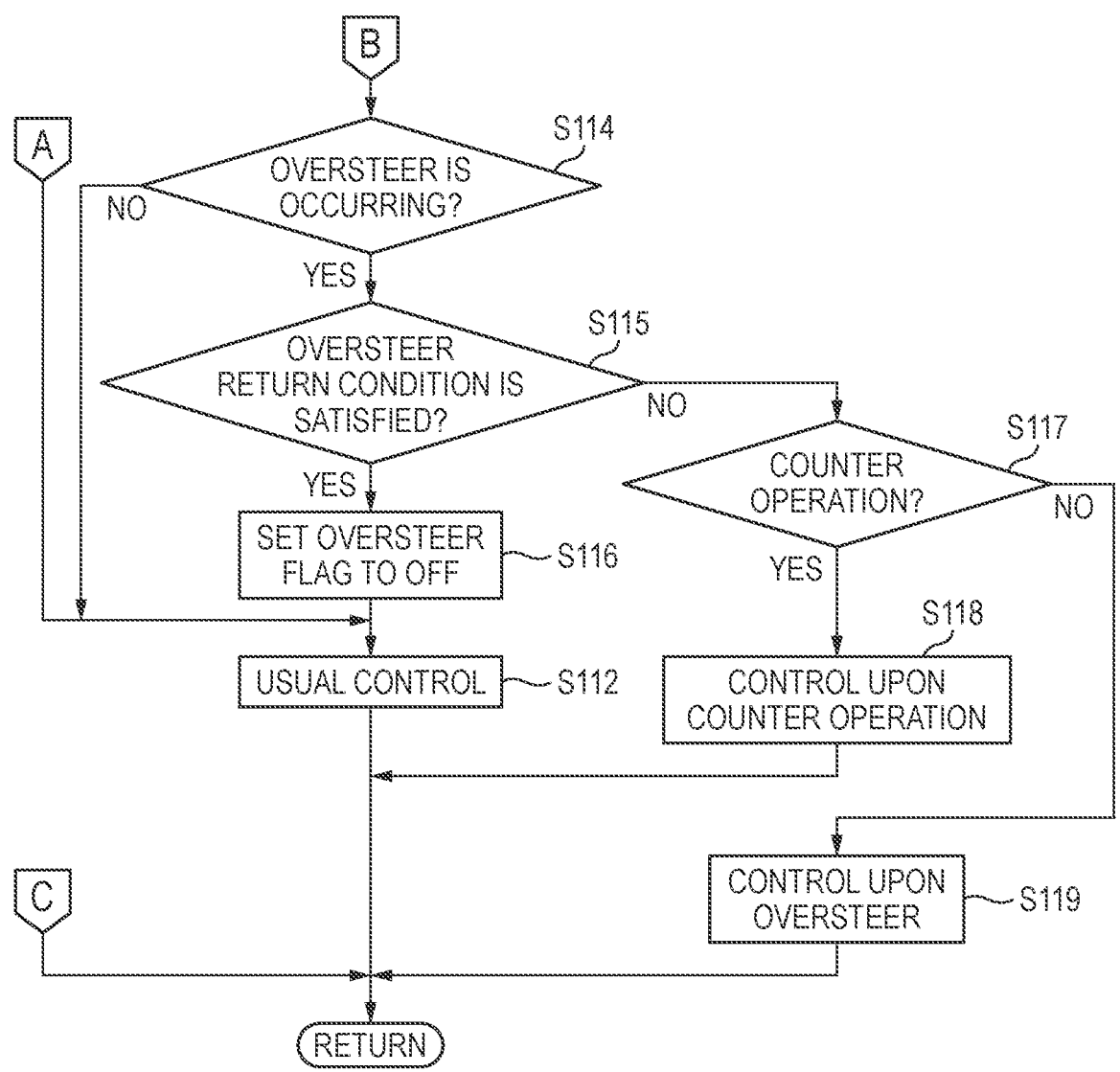
FIG. 7B is a flowchart for illustrating the sideslip suppression processing of the embodiment of the first aspect of the present invention.

Subsequently, the sideslip suppression processing of the embodiment is described with reference to FIGS. 7A and 7B. FIGS. 7A and 7B are flowcharts for illustrating the sideslip suppression processing of the embodiment.

The control device 10 calculates the vehicle request torque Cartrq (S100). The control device 10 calculates the vehicle request torque Cartrq, based on the vehicle speed Spd and the accelerator opening degree Accel.

The control device 10 calculates the estimated turning radius Rad (S101), and calculates the target yaw rate Yawtag (S102). The control device 10 calculates the target yaw rate Yawtag based on the vehicle speed Spd and the estimated turning radius Rad. The control device 10 detects the real yaw rate Yawreal (S103).

The control device 10 calculates the yaw rate deviation Delyaw based on the target yaw rate Yawtag and the real yaw rate Yawreal (S104), and determines whether new understeer has occurred (S105). When the yaw rate deviation Delyaw is larger than a value obtained by multiplying the target yaw rate Yawtag by the understeer determination coefficient Usgain, the control device 10 determines that new understeer has occurred.

When it is determined that new understeer has occurred (S105: Yes), the control device 10 sets the understeer flag Usfrg to "ON" (S106).

When it is determined that new understeer has not occurred (S105: No), the control device 10 determines whether new oversteer has occurred (S107). When the yaw rate deviation Delyaw is smaller than a value obtained by multiplying the target yaw rate Yawtag by the oversteer determination coefficient Osgain, the control device 10 determines that new oversteer has occurred.

When it is determined that new oversteer has occurred (S107: Yes), the control device 10 sets the oversteer flag Osfrg to "ON" (S108). When it is determined that new oversteer has not occurred (S107: No), the control device 10 determines that new understeer and new oversteer have not occurred, and proceeds to step S109 to proceed with the processing.

The control device 10 determines whether the understeer is occurring (S109). Specifically, the control device 10 determines whether the understeer flag Usfrg is "ON". When it is determined that the understeer flag Usfrg is "ON" and the understeer is occurring (S109: Yes), the control device 10 determines whether the understeer return condition is satisfied (S110).

When it is determined that the understeer return condition is satisfied (S110: Yes), the control device 10 sets the understeer flag Usfrg to "OFF" (S111), and performs the usual control (S112). For example, the control device 10 sets the torque obtained by quadrisecting the vehicle request torque Cartrq, as the usual torque. For example, when the yaw rate deviation Delyaw, which is a deviation between the target yaw rate Yawtag and the real yaw rate Yawreal, becomes equal to or smaller than a predetermined threshold value, the control device 10 ends the control upon understeer, and performs the usual control. When the brake pedal is depressed by the driver while the understeer is occurring, the control device 10 ends the control upon understeer, and performs the usual control.

When it is determined that the understeer return condition is not satisfied (S110: No), the control device 10 performs the control upon understeer (S113). Specifically, the control device 10 sets the understeer torque so that the braking torque is generated in the motor 2 configured to rotate the rear wheel 1R on an inner side with respect to the turning and the drive torque is increased in the motor 2 configured to rotate the front wheel 1F on an outer side with respect to the turning. The control device 10 also sets the understeer torque so that the torques of the motor 2 configured to rotate the rear wheel 1R on an outer side with respect to the turning and the motor 2 configured to rotate the front wheel 1F on an inner side with respect to the turning become zero.

When it is determined that the understeer is not occurring (S109: No), the control device 10 determines whether the oversteer is occurring (S114). Specifically, the control device 10 determines whether the oversteer flag Osfrg is "ON". When it is determined that the oversteer flag Osfrg is "ON" and the oversteer is occurring (S114: Yes), the control device 10 determines whether the oversteer return condition is satisfied (S115).

When it is determined that the oversteer return condition is satisfied (S115: Yes), the control device 10 sets the oversteer flag Osfrg to "OFF" (S116), and performs the usual control (S112). For example, when it is determined that the occurrence direction of the real yaw rate Yawreal is inverted, the control device 10 ends the control upon oversteer, and performs the usual control. When the brake pedal is depressed by the driver while the oversteer is occurring, the control device 10 ends the control upon oversteer, and performs the usual control.

When it is determined that the oversteer return condition is not satisfied (S115: No), the control device 10 determines whether the counter operation has been performed (S117). When it is determined that the counter operation has been performed (S117: Yes), the control device 10 performs the control upon counter operation (S118). When the counter operation is performed by the driver while performing the control upon oversteer, the control device 10 performs the control upon counter operation. Specifically, the control device 10 sets the counter torque so that a half drive torque of the vehicle request torque Cartrq is generated on each of the front wheels 1F.

When it is determined that the counter operation is not performed (S117: No), the control device 10 performs the control upon oversteer (S119). Specifically, the control device 10 sets the oversteer torque so that the braking torque is generated in the motor 2 configured to rotate the front wheel 1F on an outer side with respect to the turning and the drive torque is increased in the motor 2 configured to rotate the rear wheel 1R on an inner side with respect to the turning. The control device 10 also sets the oversteer torque so that the torques of the motor 2 configured to rotate the front wheel 1F on an inner side with respect to the turning and the motor 2 configured to rotate the rear wheel 1R on an outer side with respect to the turning become zero.

When it is determined that the oversteer is not occurring (S114: No), the control device 10 performs the usual control (S112) because the understeer and the oversteer are not occurring.

Note that, the sideslip suppression processing is not limited to the above sequence. For example, the control device 10 may calculate the estimated turning radius Rad before calculating the vehicle request torque Cartrq. The control device 10 may also determine whether the oversteer has occurred, before determining whether the understeer has occurred, for example.

Subsequently, effects of the control device 10 of the embodiment are described.

The control device 10 is configured to control the vehicle C configured to rotate each of the four or more drive wheels 1 by each of the different motors 2. The control device 10 includes the control unit 11 configured to control the torques that are generated by the motors 2. When the oversteer has occurred during turning of the vehicle, the control unit 11 performs the control upon oversteer of causing the motor 2 configured to rotate the front wheel 1F on an outer side with respect to the turning to generate the braking torque and increasing the drive torque of the motor 2 configured to rotate the rear wheel 1R on an inner side with respect to the turning.

Thereby, when the oversteer has occurred during turning of the vehicle C, the control device 10 can return the vehicle C to the predetermined turning course at an early stage. Also, the control device 10 can return the vehicle C to the predetermined turning course by adjusting the torques of the motors 2. For this reason, for example, when the oversteer has occurred during turning of the vehicle C, it is possible to return the vehicle C to the predetermined turning course without using a braking system configured to individually adjust a hydraulic pressure of a mechanical brake provided to each of the drive wheels 1. Therefore, the control device 10 can return the vehicle C to the predetermined turning course by adjusting the torque of each of the motors 2 without using the braking system configured to individually adjust the hydraulic pressures of the mechanical brakes.

When it is determined that the sign of the real yaw rate Yawreal of the vehicle C is inverted, the control unit 11 ends the control upon oversteer.

Thereby, the control device 10 can suppress excessive yaw moment for returning the vehicle to the predetermined turning course from occurring. For this reason, the control device 10 can stabilize the behaviors of the vehicle C to stabilize a traveling ability of the vehicle C.

When the counter operation is performed by the driver during the control upon oversteer, the control unit 11 performs the control upon counter operation of reducing the braking torque.

Thereby, when the oversteer has occurred and the counter operation is performed by the driver, the control device 10 can suppress excessive yaw moment for returning the vehicle to the predetermined turning course from occurring. For this reason, the control device 10 can stabilize behaviors of the vehicle C to stabilize a traveling ability of the vehicle C. Therefore, when the oversteer has occurred and the counter operation is performed by the driver, the control device 10 can improve the safety.

During the control upon counter operation, the control unit 11 causes the drive torques to be preferentially generated by the motors 2 configured to rotate the front wheels 1F.

Thereby, during the control upon counter operation, the control device 10 can cause the drive torques to be generated on the front wheels 1F, which are steered wheels, thereby returning the vehicle C to the predetermined turning course according to the counter operation by the driver.

The control unit 11 is configured to determine whether to end the control upon oversteer, based on the occurrence direction of the real yaw rate Yawreal.

Thereby, the control device 10 can end the control upon oversteer at an appropriate timing, and suppress excessive yaw moment for returning the vehicle to the predetermined turning course from occurring.

The control unit 11 is configured to determine whether to end the control upon understeer, based on the deviation between the target yaw rate Yawtag and the real yaw rate Yawreal.

Thereby, the control device 10 can end the control upon understeer at an appropriate timing, and can stabilize the behaviors of the vehicle C when the vehicle returns to the predetermined turning course, thereby stabilizing a traveling ability of the vehicle C.

The control device 10 is configured to control the vehicle C configured to rotate each of the four or more drive wheels 1 by each of the different motors 2. The control device 10 is configured to control the torques that are generated by the motors 2. When the understeer has occurred during turning of the vehicle, the control unit 11 performs the control upon understeer of causing the motor 2 configured to rotate the rear wheel 1R on an inner side with respect to the turning to generate the braking torque and increasing the drive torque of the motor 2 configured to rotate the front wheel 1F on an outer side with respect to the turning.

Thereby, when the understeer has occurred during turning of the vehicle C, the control device 10 can return the vehicle C to the predetermined turning course at an early stage. Also, the control device 10 can return the vehicle C to the predetermined turning course by adjusting the torques of the motors 2. The control device 10 can return the vehicle C to the predetermined turning course by adjusting the torque of each of the motors 2 without using the braking system configured to individually adjust the hydraulic pressures of the mechanical brakes.

When it is determined that the yaw rate deviation Delyaw between the target yaw rate Yawtag of the vehicle C and the real yaw rate Yawreal of the vehicle C becomes equal to or smaller than the predetermined threshold value, the control unit 11 ends the control upon understeer.

Thereby, the control device 10 can stabilize the behaviors of the vehicle C when the vehicle returns to the predetermined turning course, thereby stabilizing a traveling ability of the vehicle C.

When at least one of the oversteer and the understeer has occurred during turning of the vehicle and the braking torque is to be thus generated, the control device 10 adjusts the drive torque so that the summed value of the braking torque and the drive torque does not exceed the vehicle request torque Cartrq.

Thereby, the control device 10 can suppress the excessive drive torque from being generated with respect to the vehicle request torque Cartrq. For this reason, when returning the vehicle to the predetermined turning course, the control device 10 can suppress the rapid change in vehicle speed Spd, thereby stabilizing the occupant's posture.

When at least one of the oversteer and the understeer is occurring during turning of the vehicle, the control device 10 returns to the usual control if the brake pedal is depressed by the driver.

Thereby, when the brake pedal is depressed by the driver, it is possible to suppress the yaw moment, which causes excessive return with respect to the predetermined turning course, from occurring. For this reason, the control device 10 can stabilize the behaviors of the vehicle C, thereby stabilizing a traveling ability of the vehicle C. Therefore, the control device 10 can improve the safety when the brake pedal is depressed by the driver.

Note that, in the embodiment, the sideslip suppression control that is executed after sideslip has occurred has been described. However, sideslip prevention control of preventing occurrence of sideslip when the vehicle C turns may also be executed. That is, the control device 10 may execute the sideslip prevention control, and execute the sideslip suppression control when sideslip occurs. Some of the sideslip suppression control may also be applied to the vehicle C configured to perform automatic driving.

In the embodiment, the vehicle C may include an electric brake system. In the vehicle C including an electric brake system, for example, the control of generating the braking torque is executed by the electric brake system. Note that, the sideslip suppression control is also effectively performed even in the vehicle C with no electric brake system. For this reason, when the vehicle C with no electric brake system is caused to execute the sideslip suppression control, it is possible to save the cost by omitting the electric brake system.

The above descriptions relate to the embodiment of the first aspect of the present invention for controlling the vehicle when the oversteer or the understeer has occurred during turning of the vehicle. The vehicle control device and the control method of the present invention may adopt only the first aspect of the present invention or may adopt both the first aspect of the present invention and a second aspect to be described later.

Examples of the configuration of the first aspect of the present invention are described as follows.

[1] A vehicle control device configured to control a vehicle configured to rotate each of four or more drive wheels by each of different motors, the vehicle control device including:

a motor control unit configured to control torques that are generated by the motors, wherein when oversteer has occurred during turning of the vehicle, the motor control unit performs a control upon oversteer of causing the motor configured to rotate a front wheel on an outer side with respect to the turning to generate braking torque and increasing drive torque of the motor configured to rotate a rear wheel on an inner side with respect to the turning.

[2] The vehicle control device according to the above [1], wherein when it is determined that an occurrence direction of a real yaw rate of the vehicle is inverted, the motor control unit ends the control upon oversteer.

[3] The vehicle control device according to the above [1] or [2], wherein when a counter operation is performed by a driver during the control upon oversteer, the motor control unit performs a control upon counter operation of reducing the braking torque.

[4] The vehicle control device according to the above [3], wherein during the control upon counter operation, the motor control unit causes the drive torque to be generated preferentially by the motors configured to rotate steered wheels of the drive wheels.

[5] The vehicle control device according to any one of the above [1] to [4], wherein when the understeer has occurred during turning of the vehicle, the motor control unit performs a control upon understeer of causing the motor configured to rotate a rear wheel on an inner side with respect to the turning to generate braking torque and increasing drive torque of the motor configured to rotate a front wheel on an outer side with respect to the turning.

[6] The vehicle control device according to the above [5], wherein the motor control unit is configured to determine whether to end the control upon oversteer, based on an occurrence direction of a real yaw rate of the vehicle, and to determine whether to end the control upon understeer, based on a deviation between a target yaw rate of the vehicle and a real yaw rate of the vehicle.

[7] A vehicle control device configured to control a vehicle configured to rotate each of four or more drive wheels by each of different motors, the vehicle control device including:

a motor control unit configured to control torques that are generated by the motors, wherein when understeer has occurred during turning of the vehicle, the motor control unit performs a control upon understeer of causing the motor configured to rotate a rear wheel on an inner side with respect to the turning to generate braking torque and increasing drive torque of the motor configured to rotate a front wheel on an outer side with respect to the turning.

[8] The vehicle control device according to the above [7], wherein when it is determined that a deviation between a target yaw rate of the vehicle and a real yaw rate of the vehicle becomes equal to or smaller than a predetermined threshold value, the motor control unit ends the control upon understeer.

[9] The vehicle control device according to any one of the above [1] to [8], wherein when at least one of oversteer and understeer has occurred during turning of the vehicle, the motor control unit reduces drive torques of the motor configured to rotate a front wheel on an inner side with respect to the turning and the motor configured to rotate a rear wheel on an outer side with respect to the turning.

[10] The vehicle control device according to any one of the above [1] to [9], wherein, in a case where the motor control unit generates the braking torque when at least one of oversteer and understeer has occurred during turning of the vehicle, the motor control unit adjusts the drive torque so that a summed value of the braking torque and the drive torque does not exceed a request torque to the vehicle.

[11] The vehicle control device according to any one of the above [1] to [10], wherein when at least one of oversteer and understeer has occurred during turning of the vehicle, the motor control unit returns to a usual control if a brake pedal is depressed by a driver.

[12] A control method of controlling a vehicle configured to rotate each of four or more drive wheels by each of different motors, the control method including:

when oversteer has occurred during turning of the vehicle, causing the motor configured to rotate a front wheel on an outer side with respect to the turning to generate braking torque and increasing drive torque of the motor configured to rotate a rear wheel on an inner side with respect to the turning.

[13] A control method of controlling a vehicle configured to rotate each of four or more drive wheels by each of different motors, the control method including:

when understeer has occurred during turning of the vehicle, causing the motor configured to rotate a rear wheel on an inner side with respect to the turning to generate braking torque and increasing drive torque of the motor configured to rotate a front wheel on an outer side with respect to the turning.

Second Aspect

Hereinafter, a vehicle control device and a control method of an embodiment of a second aspect will be described in detail with reference to the accompanying drawings. Note that, the present invention is not limited to the present embodiment.

A control method of the embodiment is described. The control method of the embodiment is executed by a control device 10 (vehicle control device). The control device 10 is mounted on a vehicle C. The vehicle C has a plurality of drive wheels 1. For example, the vehicle C has four drive wheels 1. The vehicle C is configured to rotate each of the drive wheels 1 by each of different motors 2. The motor 2 is a so-called in-wheel motor.

In the below, the front drive wheels 1 of the vehicle C are referred to as "front wheels 1F" and the rear drive wheels 1 of the vehicle C are referred to as "rear wheels 1R", in some cases, The front wheels 1F of the vehicle C are steered wheel, and when a turning request is made to the vehicle C, for example, when a steering 5 (refer to FIG. 9) is operated by a driver, the front wheels 1F are steered in a turning direction.

Figure 8A:
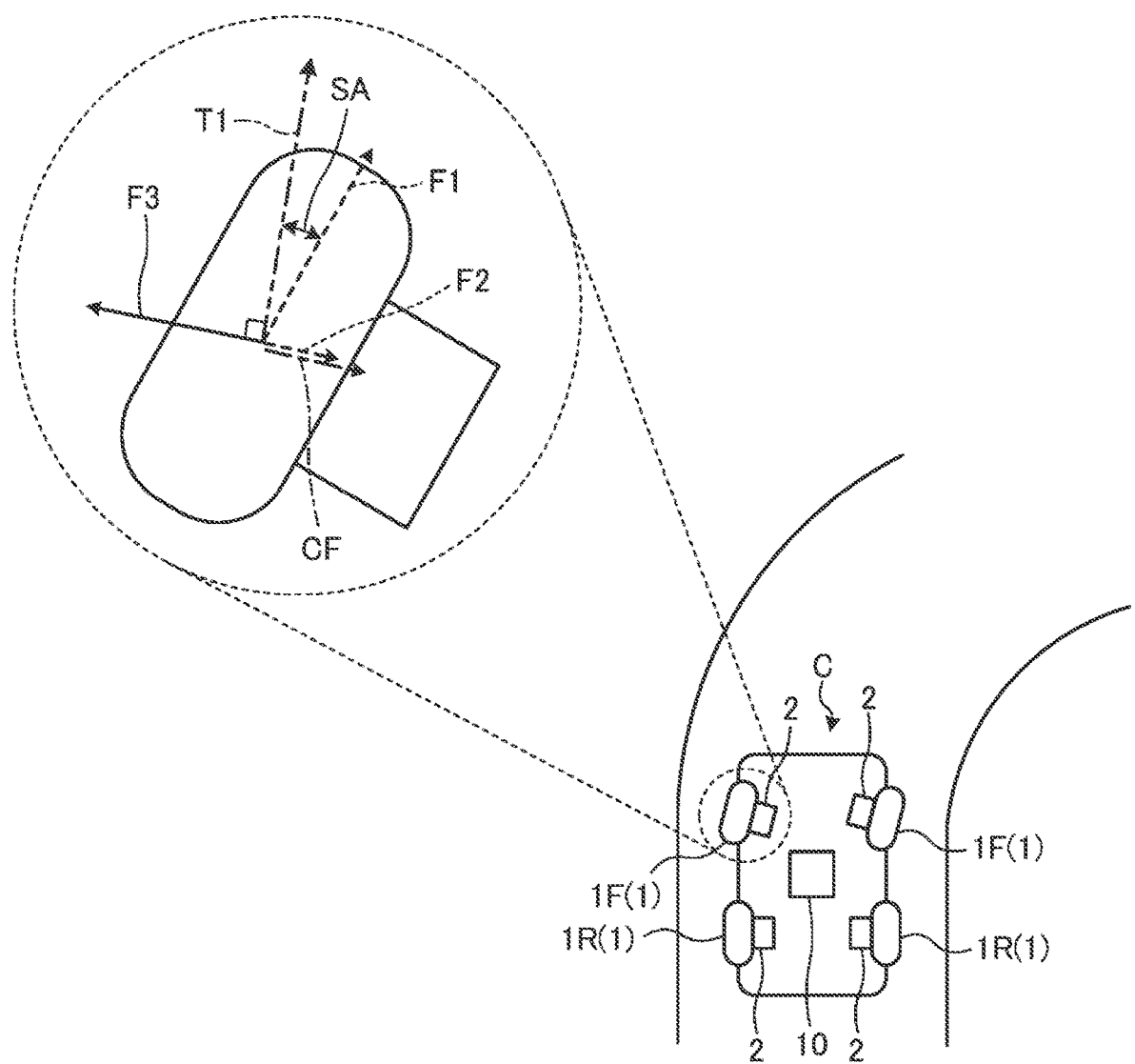
FIG. 8A is a schematic view depicting the vehicle in a turning state.

At this time, as shown in FIG. 8A, in the front wheel 1F in a turning state, a sum of a cornering force CF of the front wheel 1F and a front wheel traveling direction vertical component F2 of a drive force F1 on the front wheel 1F and a centrifugal force F3 on the front wheel 1F are balanced. The cornering force CF is a force, which is orthogonal to a traveling direction T1 of the front wheel 1F and acts in a direction of a center of a circle of the turning, of forces generated by elastic deformation of the front wheel 1F at a ground contact portion of the front wheel 1F (drive wheel 1). FIG. 8A is a schematic view depicting the vehicle C in the turning state. Note that, in FIG. 8A, the cornering force CF is shown shifted for the sake of descriptions.

The cornering force CF on the front wheel 1F is calculated by an equation (1), based on a cornering coefficient Cc, a weight m applied to the front wheel 1F and a slip angle SA. The cornering coefficient Cc is a predetermined constant. The slip angle SA is an angle between an acting direction of the drive force F1 on the front wheel 1F and the traveling direction T1 of the front wheel 1F.

$$CF = Cc \times m \times SA \quad (1)$$

The cornering force CF becomes higher as the slip angle SA becomes larger. Note that, the cornering force CF has a maximum cornering force CFmax and does not increase beyond the maximum cornering force CFmax. The maximum cornering force CFmax on the front wheel 1F is calculated by an equation (2), based on a friction coefficient $\mu$, a weight m applied to the front wheel 1F and the acceleration of gravity g.

$$CFmax = \mu \times m \times g \quad (2)$$

On the front wheel 1F, for example, when the centrifugal force F3 increases, the traveling direction T1 of the front wheel 1F shown in FIG. 8A moves in a counterclockwise direction. For this reason, the slip angle SA becomes large and the cornering force CF also increases. When the cornering force CF reaches the maximum cornering force CFmax, the cornering force CF does not increase beyond the maximum cornering force CFmax. For this reason, on the front wheels 1F, when the centrifugal force F3 becomes greater than a sum of the maximum cornering force CFmax and the front wheel traveling direction vertical component F2 of the drive force F1, sideslip occurs on the front wheels 1F, so that the vehicle C is in an understeer state.

For example, after the brake pedal is depressed by the driver, when the vehicle C turns, the vehicle C is in a front load state. The front load state is a state where a load to the front wheels 1F is greater than a load to the other drive wheels 1, for example, the rear wheels 1R. When the load to the front wheels 1F is increased by a front load, the centrifugal force F3 applied to the front wheels 1F increases. In addition, when the vehicle C turns, the front wheels 1F, which are steered wheels, are first steered according to an operation of the steering 5, for example. For this reason, in a turning start state immediately after the turning starts, only the front wheels 1F are shifted to a turning motion. When the rear wheels 1R are not in the turning state and only the front wheels 1F are in the turning state, the centrifugal force F3 is applied to only the front wheels 1F.

In a case where the vehicle C turns in the front load state, particularly, in a case of the front load state as a result of execution of the brake operation and the turning start state, the centrifugal force F3 on the front wheels 1F becomes relatively large. For this reason, sideslip is likely to occur on the front wheels 1F, and the understeer is likely to occur. Note that, the centrifugal force F3 on the front wheels 1F becomes large even in any one state of the front load state or the turning start state.

Figure 8B:
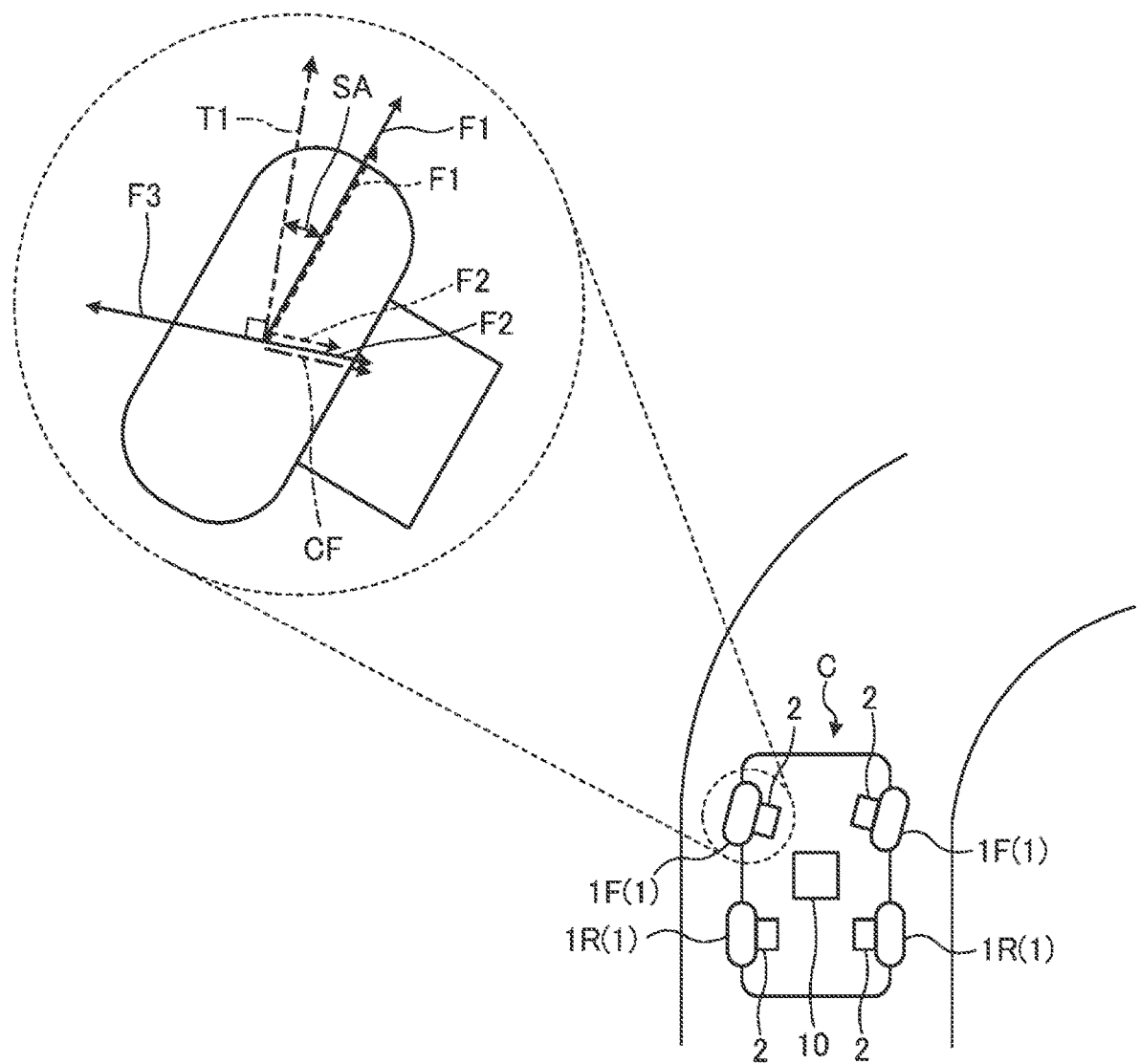
FIG. 8B is a schematic view illustrating the vehicle in a state where drive force on a front wheel is increased with respect to the turning state of FIG. 8A.

When the vehicle C is in the front load state, the control device 10 increases the drive force F1 on the front wheel 1F, as shown with an arrow of the solid line in FIG. 8B. FIG. 8B is a schematic view illustrating the vehicle C in a state where the drive force F1 on the front wheel 1F is increased with respect to the turning state of FIG. 8A. In FIG. 8B, the increased drive force F1 and the front wheel traveling direction vertical component F2 of the increased drive force F1 are shown with the solid lines. In FIG. 8B, for the sake of descriptions, the drive force F1 and the front wheel traveling direction vertical component F2 on the front wheel 1F of FIG. 8A are shown with the broken lines. Also, in FIG. 8B, for the sake of descriptions, the cornering force CF, the drive force F1 of FIG. 8A and the front wheel traveling direction vertical component F2 are shown shifted.

For example, the control device 10 is configured to increase the drive force F1 on the front wheel 1F (to increase the drive torque to be distributed to the front wheel 1F) by increasing drive torque of the motor 2 configured to rotate the front wheel 1F. The drive torque is torque for generating a drive force on the drive wheel 1. The drive torque is positive torque. Note that, in descriptions below, the torque for generating the braking force on the drive wheel 1 may be referred to as braking torque. The braking torque is negative torque. The control device 10 is configured to set the drive torque of the motor 2 configured to rotate the front wheel 1F greater as a load to the front wheel 1F is greater than a load to the rear wheel 1R.

The control device 10 can increase the front wheel traveling direction vertical component F2 of the drive force F1 and suppress the cornering force CF (slip angle SA) from increasing by increasing the drive torque of the motor 2 configured to rotate the front wheel 1F. For this reason, the control device 10 can secure a margin until the cornering force CF reaches the maximum cornering force CFmax. Therefore, the control device 10 can prevent sideslip from occurring on the vehicle C. For example, the control device 10 can prevent understeer from occurring on the vehicle C.

Figure 9:
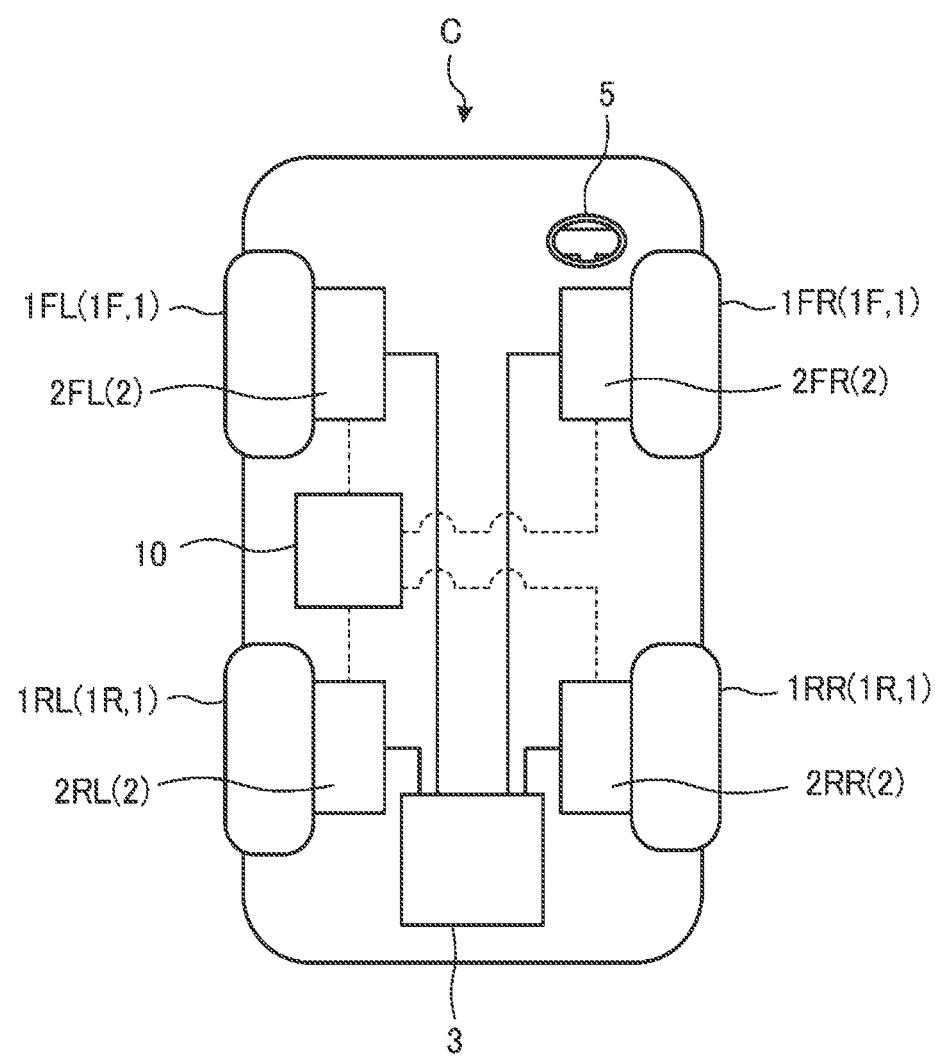
FIG. 9 is a schematic view illustrating a part of a vehicle of an embodiment of a second aspect.

Subsequently, the vehicle C of the embodiment is described with reference to FIG. 9. FIG. 9 is a schematic view illustrating a part of the vehicle C of the embodiment.

The vehicle C includes four drive wheels 1, four motors 2, a battery 3 and a control device 10.

The four drive wheels 1 include a left front wheel 1FL, a right front wheel 1FR, a left rear wheel 1RL and a right rear wheel 1RR. The four motors 2 include a motor 2FL for the left front wheel, a motor 2FR for the right front wheel, a motor 2RL for the left rear wheel and a motor 2RR for the right rear wheel.

The motor 2FL for the left front wheel is configured to rotate the left front wheel 1FL. The motor 2FR for the right front wheel is configured to rotate the right front wheel 1FR. The motor 2RL for the left rear wheel is configured to rotate the left rear wheel 1RL. The motor 2RR for the right rear wheel is configured to rotate the right rear wheel 1RR.

Each of the motors 2 is supplied with electric power from the battery 3. The torque of each of the motors 2 is controlled based on a control signal input from the control device 10. Specifically, each of the motors 2 is configured to generate drive torque or braking torque, based on the control signal. The torque generated by each of the motors 2 is transmitted to each of the drive wheels 1.

The control device 10 is a controller configured to individually control each of the motors 2. The control device 10 is configured to output a control signal to each of the motors 2 and to control each of the motors 2, according to an operating amount of an accelerator pedal, an operating amount of a brake pedal or the like, for example.

For example, when the accelerator pedal is operated and an acceleration request is thus made to the vehicle C, the control device 10 controls each of the motors 2 so that the drive torque for accelerating the vehicle C is output from each of the motors 2 to each of the drive wheels 1. Thereby, the vehicle C performs acceleration traveling.

In addition, for example, when the brake pedal is operated and a deceleration request is thus made to the vehicle C, the control device 10 controls each of the motors 2 so that the braking torque for decelerating the vehicle C is output from each of the motors 2 to each of the drive wheels 1. Thereby, the vehicle C performs deceleration traveling. Note that, when the deceleration request is made to the vehicle C, the vehicle C may perform the deceleration traveling by using a mechanical brake.

In addition, for example, when the steering 5 is operated and a turning request is thus made to the vehicle C, the control device 10 steers the left front wheel 1FL and the right front wheel 1FR, as described above.

Figure 10:
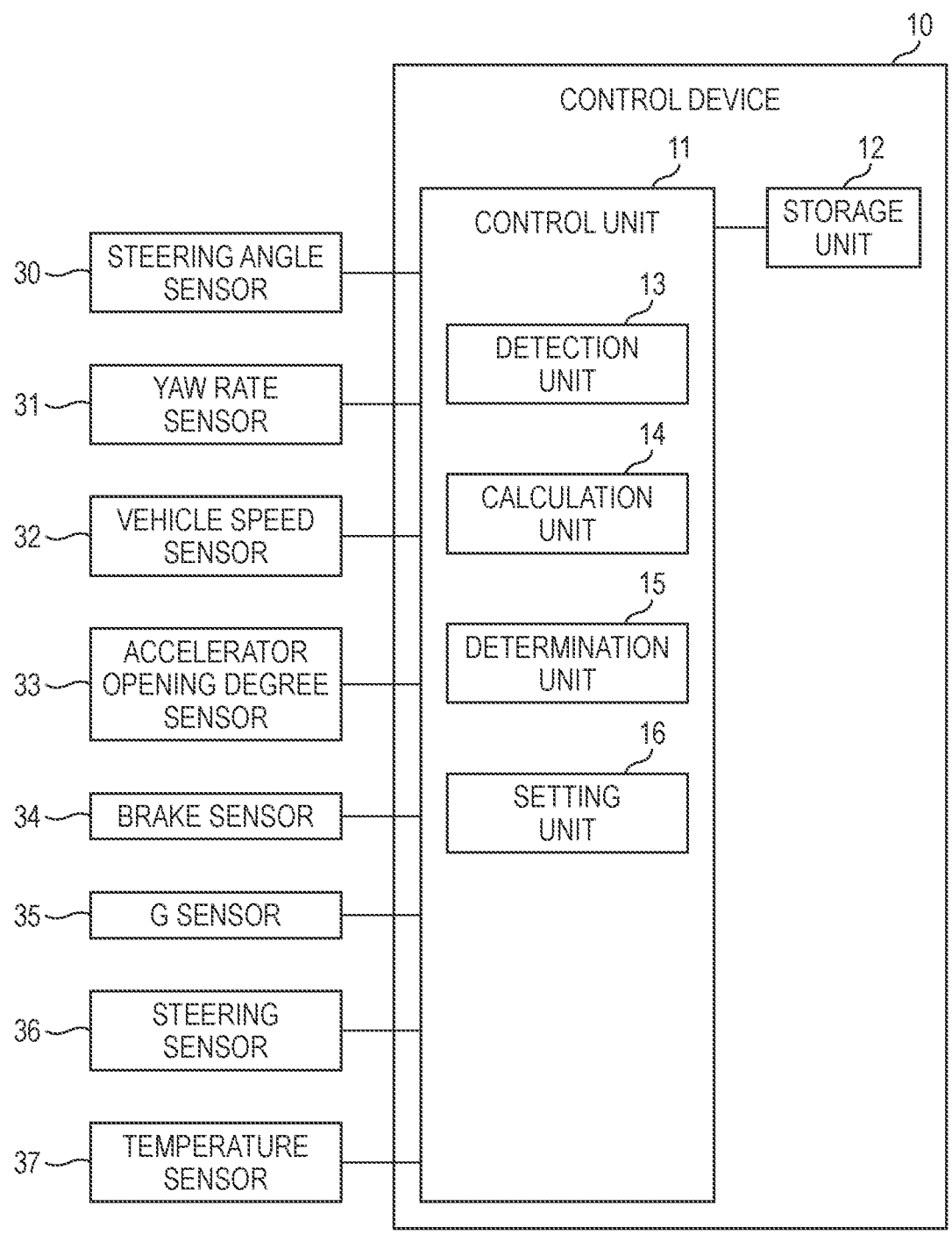
FIG. 10 is a block diagram depicting a configuration of a control device of the embodiment of the second aspect.

Subsequently, a configuration of the control device 10 of the embodiment is described with reference to FIG. 10. FIG. 10 is a block diagram depicting a configuration of the control device 10 of the embodiment. Note that, in FIG. 10, only constitutional elements necessary to describe features of the present embodiment are shown by functional blocks and general constitutional elements are not shown.

In other words, each constitutional element shown in FIG. 10 is a functional concept and is not necessarily required to be physically configured as shown. For example, a specific form of distribution/integration of functional blocks is not limited to the shown form and some or all thereof may be functionally or physically distributed/integrated in arbitrary units according to various loads, use situations and the like.

The control device 10 includes a control unit 11 (motor control unit) and a storage unit 12. The storage unit 12 is constituted by a storage device such as a non-volatile memory, a data flash, a hard disk drive and the like, for example. In the storage unit 12, map information, diverse programs and the like are stored.

The control unit 11 includes a detection unit 13, a calculation unit 14, a determination unit 15 and a setting unit 16. The control unit 11 includes a computer or diverse circuits having a CPU, a ROM (Read Only Memory), a RAM (Random Access Memory), a hard disk drive, input/output ports and the like, for example.

The CPU of the computer is configured to function as the detection unit 13, the calculation unit 14, the determination unit 15 and the setting unit 16 of the control unit 11 by reading and executing a program stored in the ROM, for example.

At least some or all of the detection unit 13, the calculation unit 14, the determination unit 15 and the setting unit 16 of the control unit 11 may be constituted by hardware such as ASIC (Application Specific Integrated Circuit) and FPGA (Field Programmable Gate Array).

The detection unit 13 is input with signals from diverse sensors provided to the vehicle C. The diverse sensors include steering angle sensors 30, a yaw rate sensor 31, a vehicle speed sensor 32, an accelerator opening degree sensor 33, a brake sensor 34, a G sensor 35, a steering sensor 36, temperature sensors 37, and the like.

The detection unit 13 is configured to detect a steering angle θ of the steered wheel, based on a signal input from the steering angle sensor 30. The steering angle sensor 30 is provided to each of the left front wheel 1FL and the right front wheel 1FR. That is, the detection unit 13 is configured to detect each of a steering angle θ of the left front wheel 1FL and a steering angle θ of the right front wheel 1FR. Note that, in descriptions below, a steering angle of the front wheel 1F on an inner side during turning may also be denoted as "θ1" and as steering angle of the front wheel 1F on an outer side during turning may also be denoted as "θ2".

The detection unit 13 is configured to detect a current yaw rate Yawreal (hereinafter, referred to as "real yaw rate Yawreal") of the vehicle C, based on a signal input from the yaw rate sensor 31.

The detection unit 13 is configured to detect a vehicle speed Spd, based on a signal input from the vehicle speed sensor 32. The detection unit 13 is configured to detect an accelerator opening degree Accel, which is a depression amount of an accelerator pedal, based on a signal input from the accelerator opening degree sensor 33.

The detection unit 13 is configured to detect a depression amount of a brake pedal, based on a signal input from the brake sensor 34. The detection unit 13 is configured to detect an acceleration ax in the X direction of the vehicle C, based on a signal input from the G sensor 35. The X direction of the vehicle C is a front and rear direction of the vehicle C. The acceleration ax in the X direction is a positive value in a case of the acceleration in the forward direction of the vehicle C.

The detection unit 13 is configured to detect a steering operating amount Strangl, based on a signal input from the steering sensor 36. The steering operating amount Strangl is an operating amount based on a position of the steering 5 when the vehicle C travels straight.

The detection unit 13 is configured to detect a temperature of the motor 2, based on a signal input from the temperature sensor 37. Note that, the temperature sensor 37 is provided to each of the motors 2, and the detection unit 13 is configured to detect the temperature of each of the motors 2.

The calculation unit 14 is configured to calculate an estimated turning radius Rad. The calculation unit 14 is configured to calculate the estimated turning radius Rad by using an equation (1), based on a wheelbase L, the steering angle θ1 of the front wheel 1F on an inner side during turning and the steering angle θ2 of the front wheel 1F on an outer side during turning.

$$Rad = (L/\sin\theta_1 + L/\tan\theta_2)/2 \tag{3}$$

The calculation unit 14 is configured to calculate an upper limit vehicle speed Spdlmt. Specifically, the calculation unit 14 is configured to calculate the upper limit vehicle speed Spdlmt by using an equation (4), based on the estimated turning radius Rad and an upper limit centrifugal acceleration CNTYDNG. The upper limit centrifugal acceleration CNTYDNG is a predetermined value, and is a value at which sideslip can be suppressed from occurring on the vehicle C. When the centrifugal force F3 becomes higher and the cornering force CF becomes higher, the vehicle C may sideslip. The centrifugal force F3 is proportional to the centrifugal acceleration, and is related to the centrifugal acceleration. For this reason, the calculation unit 14 is configured to calculate the upper limit vehicle speed Spdlmt corresponding to the upper limit centrifugal acceleration CNTYDNG.

$$\text{Spdlmt} = (\text{Rad} \times \text{CNTYDNG})^{1/2} \quad (4)$$

The calculation unit 14 is configured to calculate a vehicle request torque Cartrq. Specifically, when the detected vehicle speed Spd is equal to or greater than the upper limit vehicle speed Spdlmt, the calculation unit 14 calculates the vehicle request torque Cartrq by feedback control based on a deviation between the vehicle speed Spd and the upper limit vehicle speed Spdlmt. The calculation unit 14 is configured to set a target vehicle speed so that the vehicle speed Spd is equal to or lower than the upper limit vehicle speed Spdlmt, and to calculate the vehicle request torque Cartrq becoming the target vehicle speed. In this case, the vehicle request torque Cartrq is torque for limiting the vehicle speed Spd to the upper limit vehicle speed Spdlmt or lower, and is negative torque. That is, the vehicle request torque Cartrq is the braking torque. The vehicle request torque Cartrq is braking torque for limiting the vehicle speed Spd to the upper limit vehicle speed Spdlmt or lower.

Figure 11:
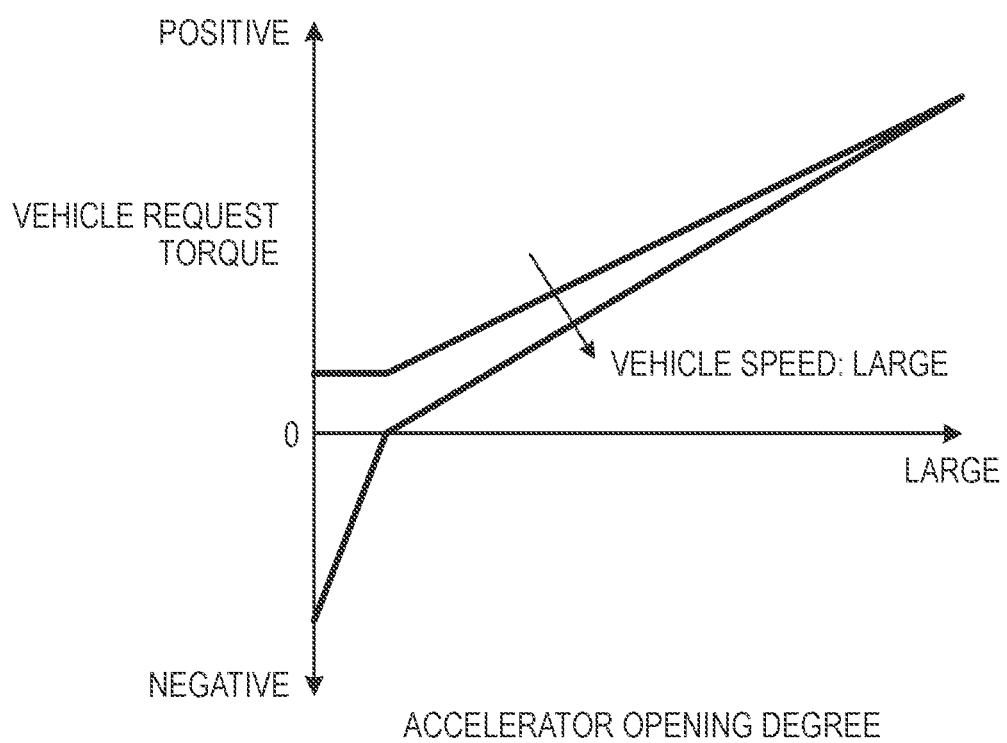
FIG. 11 is a map for calculating vehicle request torque.

When the detected vehicle speed Spd is smaller than the upper limit vehicle speed Spdlmt, the calculation unit 14 calculates the vehicle request torque Cartrq from a map shown in FIG. 11, based on the vehicle speed Spd and the accelerator opening degree Accel. FIG. 11 depicts a map for calculating the vehicle request torque Cartrq. The calculation unit 14 may also be configured to calculate the vehicle request torque Cartrq from a calculation equation or the like, without using the map.

The calculation unit 14 is configured to calculate a front wheel load ratio Frwigtrt. Specifically, the calculation unit 14 is configured to calculate the front wheel load ratio Frwigtrt by using an equation (5), based on a distance lr from a center of gravity of the vehicle C to the rear wheel 1R, a wheelbase L, a height h from the ground to the center of gravity of the vehicle C, an acceleration ax in the X direction of the vehicle C and the acceleration of gravity g.

$$\text{Frwigtrt} = (lr/L) + h \times ax / (L \times g) \quad (5)$$

The calculation unit 14 is configured to calculate a target yaw rate Yawtag. The calculation unit 14 is configured to calculate the target yaw rate Yawtag, based on the vehicle speed Spd and the estimated turning radius Rad. The calculation unit 14 is configured to calculate the target yaw rate Yawtag by using an equation (6).

$$\text{Yawtag} = \text{Spd}^2 / \text{Rad} \quad (6)$$

The calculation unit 14 is configured to calculate a yaw rate deviation Delyaw. The calculation unit 14 is configured to calculate a deviation between the target yaw rate Yawtag and the real yaw rate Yawreal, as the yaw rate deviation Delyaw.

The calculation unit 14 is configured to calculate a front wheel request drive torque Frtrqrq. Specifically, the calculation unit 14 is configured to calculate the front wheel request drive torque Frtrqrq by using an equation (7), based on a front wheel request drive base torque BASETRQ, the front wheel load ratio Frwigtrt, and the yaw rate deviation Delyaw. The front wheel request drive base torque BASETRQ is a predetermined value.

$$\text{Frtrqrq} = \text{BASETRQ} \times \text{Frwigtrt} \times \text{Delyaw} \quad (7)$$

Upon start of turning of the vehicle C, the yaw rate deviation Delyaw, which is a deviation between the target yaw rate Yawtag and the real yaw rate Yawreal, increases. For this reason, upon start of turning of the vehicle C, the front wheel request drive torque Frtrqrq increases. In addition, the front wheel request drive torque Frtrqrq becomes greater as the front wheel load ratio Frwigtrt increases. That is, the front wheel request drive torque Frtrqrq becomes greater as a load to the front wheel 1F is greater than a load to the rear wheel 1R.

The calculation unit 14 is configured to calculate a lower limit torque Rrtrqmn of the motor 2 configured to rotate the rear wheel 1R. The calculation unit 14 is configured to calculate the lower limit torque Rrtrqmn, based on a temperature of the motor 2 configured to rotate the rear wheel 1R, for example. When the temperature of the motor 2 configured to rotate the rear wheel 1R is higher than a predetermined upper limit temperature, the calculation unit 14 calculates the lower limit torque Rrtrqmn. The lower limit torque Rrtrqmn may also be calculated according to the temperature of the motor 2 configured to rotate the rear wheel 1R. For example, the lower limit torque Rrtrqmn increases as the temperature of the motor 2 configured to rotate the rear wheel 1R rises. The calculation unit 14 is configured to calculate, as the lower limit torque Rrtrqmn, a torque obtained by doubling a higher torque of a lower limit torque Mtrltrqmn of the motor 2RL for the left rear wheel configured to rotate the left rear wheel 1RL and a lower limit torque Mtrrtrqmn of the motor 2RR for the right rear wheel configured to rotate the right rear wheel 1RR. Note that, the lower limit torque Rrtrqmn is a negative value. For this reason, as the temperature of the motor 2 configured to rotate the rear wheel 1R rises, an absolute value of the lower limit torque Rrtrqmn decreases.

The determination unit 15 is configured to determine whether the vehicle speed Spd is equal to or greater than the upper limit vehicle speed Spdlmt.

The determination unit 15 is configured to determine whether a state of the vehicle C is a front load and turning state. Specifically, the determination unit 15 configured to determine whether the state of the vehicle C is a front load state and a turning state. When the state of the vehicle C is a front load state and a turning state, the determination unit 15 determines that the state of the vehicle C is the front load and turning state.

When the front wheel load ratio Frwigtrt is equal to or greater than a load determination value FRWRTOV, the determination unit 15 determines that the state of the vehicle C is a front load state. The load determination value FRWRTOV is a predetermined value.

When the steering operating amount Strangl is equal to or larger than a steering operation determination value STRQNGLTH, the determination unit 15 determines that the state of the vehicle C is a turning state. The steering operation determination value STRQNGLTH is a predetermined value. The steering operation determination value STRQNGLTH is each set according to left turn and right turn.

The determination unit 15 is configured to determine whether a predetermined torque condition is satisfied. Specifically, when the vehicle request torque Cartrq is a positive value and the vehicle request torque Cartrq is smaller than the front wheel request drive torque Frtrqrq, the determination unit 15 determines that the predetermined torque condition is satisfied. When the vehicle request torque Cartrq is equal to or smaller than zero, the determination unit 15 determines that the predetermined torque condition is not satisfied. When the vehicle request torque Cartrq is equal to or greater than the front wheel request drive torque Frtrqrq, the determination unit 15 determines that the predetermined torque condition is not satisfied.

The determination unit 15 is configured to determine whether a temporary torque TemtrqR of the rear wheel 1R, which will be described later, is smaller than the lower limit torque Rrtrqmn.

The setting unit 16 is configured to set a temporary torque Temtrq. When the state of the vehicle C is the front load and turning state and the predetermined torque condition is not satisfied, the setting unit 16 sets the temporary torque Temtrq. Specifically, the setting unit 16 is configured to set the front wheel request drive torque Frtrqrq, as a temporary torque TemtrqF of the front wheel 1F. The setting unit 16 is configured to set a torque obtained by subtracting the front wheel request drive torque Frtrqrq from the vehicle request torque Cartrq, as a temporary torque TemtrqR of the rear wheel 1R.

The setting unit 16 is configured to set torque that is generated by each of the motors 2.

When the state of the vehicle C is not the front load and turning state, the setting unit 16 sets the torque that is generated by each of the motors 2 to usual torque. For example, the state of the vehicle C that is not the front load and turning state includes a case where the vehicle C is not in the turning state, i.e., the vehicle C travels straight. The state of the vehicle C that is not in the front load and turning state includes a case where the vehicle C is not in the front load state and turns. The usual torque is the torque at which torque is evenly generated on each wheel with respect to the vehicle request torque Cartrq. For example, the setting unit 16 sets torque obtained by quadrisecting the vehicle request torque Cartrq as the usual torque of each of the motors 2.

When the state of the vehicle C is the front load and turning state and the predetermined torque condition is satisfied, the setting unit 16 sets the torque that is generated by each of the motors 2 to a first front load turning torque. The first front load turning torque is torque at which the vehicle request torque Cartrq is generated only by the motor 2 configured to rotate the front wheel 1F. That is, in the first front load turning torque, the torque of the motor 2 configured to rotate the rear wheel 1R becomes zero.

The setting unit 16 is configured to set torque obtained by bisecting the vehicle request torque Cartrq, as the first front load turning torque of the motor 2FL for the left front wheel and the first front load turning torque of the motor 2FR for the right front wheel. The setting unit 16 is also configured to set the first front load turning torque of the motor 2RL for the left rear wheel and the first front load turning torque of the motor 2RR for the right rear wheel to zero.

When the vehicle request torque Cartrq is a positive value and the vehicle request torque Cartrq is smaller than the front wheel request drive torque Frtrqrq, if the drive torque generated on the entire vehicle C becomes the front wheel request drive torque Frtrqrq, the vehicle C may accelerate rapidly. For this reason, when the state of the vehicle C is the front load and turning state and the predetermined torque condition is satisfied, the setting unit 16 sets the torque that is generated by each of the motors 2 to the first front load turning torque. Thereby, it is possible to prevent torque, which is equal to or greater than torque requested by the driver as the drive torque of the vehicle C, from being output, thereby avoiding a feeling of runaway.

When the state of the vehicle C is the front load and turning state, the predetermined torque condition is not satisfied and the temporary torque TemtrqR of the motor 2 configured to rotate the rear wheel 1R is equal to or greater than the lower limit torque Rrtrqmn, the setting unit 16 sets the torque that is generated by each of the motors 2 to a second front load turning torque. Thereby, a first control of increasing the torque of the motor 2 configured to rotate the front wheel 1F is performed.

Specifically, the setting unit 16 is configured to set the temporary torque Temtrq, as the second front load turning torque. The setting unit 16 is configured to set a torque obtained by bisecting the temporary torque TemtrqF of the front wheel 1F, specifically, the front wheel request drive torque Frtrqrq, as the second front load turning torque of the motor 2FL for the left front wheel and the second front load turning torque of the motor 2FR for the right front wheel. The setting unit 16 is configured to set a torque obtained by bisecting the temporary torque TemtrqR of the rear wheel 1R, as the second front load turning torque of the motor 2RL for the left rear wheel and the second front load turning torque of the motor 2RR for the right rear wheel.

As described above, upon start of the turning, since the yaw rate deviation Delyaw increases, the front wheel request drive torque Frtrqrq increases. For this reason, upon start of the turning, the second front load turning torque of the motor 2FL for the left front wheel and the second front load turning torque of the motor 2FR for the right front wheel increase. In addition, the second front load turning torque is set, so that a discrepancy between the real yaw rate Yawreal and the target yaw rate Yawtag is solved, and when the yaw rate deviation Delyaw decreases, the front wheel request drive torque Frtrqrq decreases. When the yaw rate deviation Delyaw decreases, the second front load turning torque of the motor 2FL for the left front wheel and the second front load turning torque of the motor 2FR for the right front wheel decrease.

Note that, even if it is at the start of turning, when the yaw rate deviation Delyaw increases due to factors such as a case where the turning radius becomes small during turning and a case where an operating amount of the steering 5 increases during turning, the front wheel request drive torque Frtrqrq increases, so that the second front load turning torque of the motor 2FL for the left front wheel and the second front load turning torque of the motor 2FR for the right front wheel increase.

In addition, the front wheel request drive torque Frtrqrq becomes greater as the front wheel load ratio Frwigtrt becomes larger. For this reason, the greater the load to the front wheels 1F than the rear wheels 1R is, the greater the second front load turning torque of the motor 2FL for the left front wheel and the second front load turning torque of the motor 2FR for the right front wheel are.

When the vehicle request torque Cartrq is negative, i.e., when the vehicle speed Spd is limited to the upper limit vehicle speed Spdlmt or lower, the setting unit 16 sets the second load turning torque so that the vehicle speed Spd is equal to or smaller than the upper limit vehicle speed Spdlmt. Thereby, a second control of controlling the torque of each of the motors 2 so that the vehicle speed Spd is equal to or smaller than the upper limit vehicle speed is performed.

For example, when the front wheel request drive torque Frtrqrq is "50 Nm" and the vehicle request torque Cartrq is "−30 Nm", the setting unit 16 sets "50 Nm", as the second front load turning torque (the temporary torque TemtrqF of the front wheel 1F) of the motor 2 configured to rotate the front wheel 1F. In addition, in order to realize the vehicle request torque Cartrq as the torque of the entire vehicle C, the setting unit 16 sets "−80 Nm", which is obtained by subtracting the front wheel request drive torque Frtrqrq "50 Nm" from the vehicle request torque Cartrq "−30 Nm", as the second front load turning torque (the temporary torque TemtrqR of the rear wheel 1R) of the motor 2 configured to rotate the rear wheel 1R. That is, when the vehicle request torque Cartrq is negative, the second front load turning torque of the motor 2 configured to rotate the rear wheel 1R becomes the braking torque. In this way, when the implementation conditions for the first control and the second control are all satisfied, the first control is preferentially performed, and the braking torque of the motor 2 configured to rotate the rear wheel 1R is generated in the second control.

When the state of the vehicle C is the front load state, the predetermined torque condition is not satisfied and the temporary torque TemtrqR of the motor 2 configured to rotate the rear wheel 1R is smaller than the lower limit torque Rrtrqmn, the setting unit 16 sets the torque that is generated by each of the motors 2 to a third front load turning torque. Thereby, the first control of increasing the torque of the motor 2 configured to rotate the front wheel 1F is performed. In addition, the second control of controlling the torque of each of the motors 2 so that the vehicle speed Spd is equal to or smaller than the upper limit vehicle speed is performed.

Specifically, the setting unit 16 is configured to set the lower limit torque Rrtrqmn, as the third front load turning torque of the motor 2 configured to rotate the rear wheel 1R. That is, the setting unit 16 is configured to limit the braking torque of the motor 2 configured to rotate the rear wheel 1R to the lower limit torque Rrtrqmn with respect to the temporary torque TemtrqR of the rear wheel 1R. While the second control is performed, when the braking torque of limiting the vehicle speed Spd to the upper limit vehicle speed Spdlmt is smaller than the lower limit torque Rrtrqmn, the braking torque of the motor 2 configured to rotate the rear wheel 1R is limited to the lower limit torque Rrtrqmn.

The setting unit 16 is also configured to limit the drive torque of the motor 2 configured to rotate the front wheel 1F, based on a limit amount of the braking torque of the motor 2 configured to rotate the rear wheel 1R. The setting unit 16 is configured to set a torque obtained by subtracting a control amount from the temporary torque TemtrqF of the motor 2 configured to rotate the front wheel 1F, as the third front load turning torque of the motor 2 configured to rotate the front wheel 1F, by using an absolute value of a deviation between the temporary torque TemtrqR of the motor 2 configured to rotate the rear wheel 1R and the lower limit torque Rrtrqmn as the limit amount. That is, when the second control is performed and the braking torque of limiting the vehicle speed Spd to the upper limit vehicle speed Spdlmt is smaller than the lower limit torque Rrtrqmn, the drive torque on the front wheel 1F in the first control is limited based on the limit amount of the braking torque of the motor 2 configured to rotate the rear wheel 1R.

For example, when the front wheel request drive torque Frtrqrq is "50 Nm", the vehicle request torque Cartrq is "−30 Nm" and the lower limit torque Rrtrqmn is "−60 Nm", the temporary torque TemtrqR of the motor 2 configured to rotate the rear wheel 1R is "−80 Nm" obtained by subtracting the front wheel request drive torque Frtrqrq "50 Nm" from the vehicle request torque Cartrq "−30 Nm".

In this case, since the temporary torque TemtrqR of the motor 2 configured to rotate the rear wheel 1R is smaller than the lower limit torque Rrtrqmn, the setting unit 16 sets the lower limit torque Rrtrqmn "−60 Nm", as the third front load turning torque of the motor 2 configured to rotate the rear wheel 1R. In addition, the setting unit 16 calculates "20 Nm" as the limit amount of the limit torque, and sets the torque "30 Nm" obtained by subtracting the limit amount from "50 Nm", which is the temporary torque TemtrqF (front wheel request drive torque Frtrqrq) of the motor 2 configured to rotate the front wheel 1F, as the third front load turning torque of the motor 2 configured to rotate the front wheel 1F.

The setting unit 16 is configured to set a torque obtained by bisecting the lower limit torque Rrtrqmn, as the third front load turning torque of the motor 2RL for the left rear wheel and the third front load turning torque of the motor 2RR for the right rear wheel. The setting unit 16 is configured to set a torque obtained by bisecting the torque obtained by subtracting the control amount from the temporary torque TemtrqF of the front wheel 1F, as the third front load turning torque of the motor 2FL for the left front wheel and the third front load turning torque of the motor 2FR for the right front wheel.

A control signal for controlling each of the motors 2 is output to each of the motors 2 so that the torque set by the setting unit 16 is generated by each of the motors 2. Thereby, the torque that is generated by each of the motors 2 is controlled.

Figure 12A:
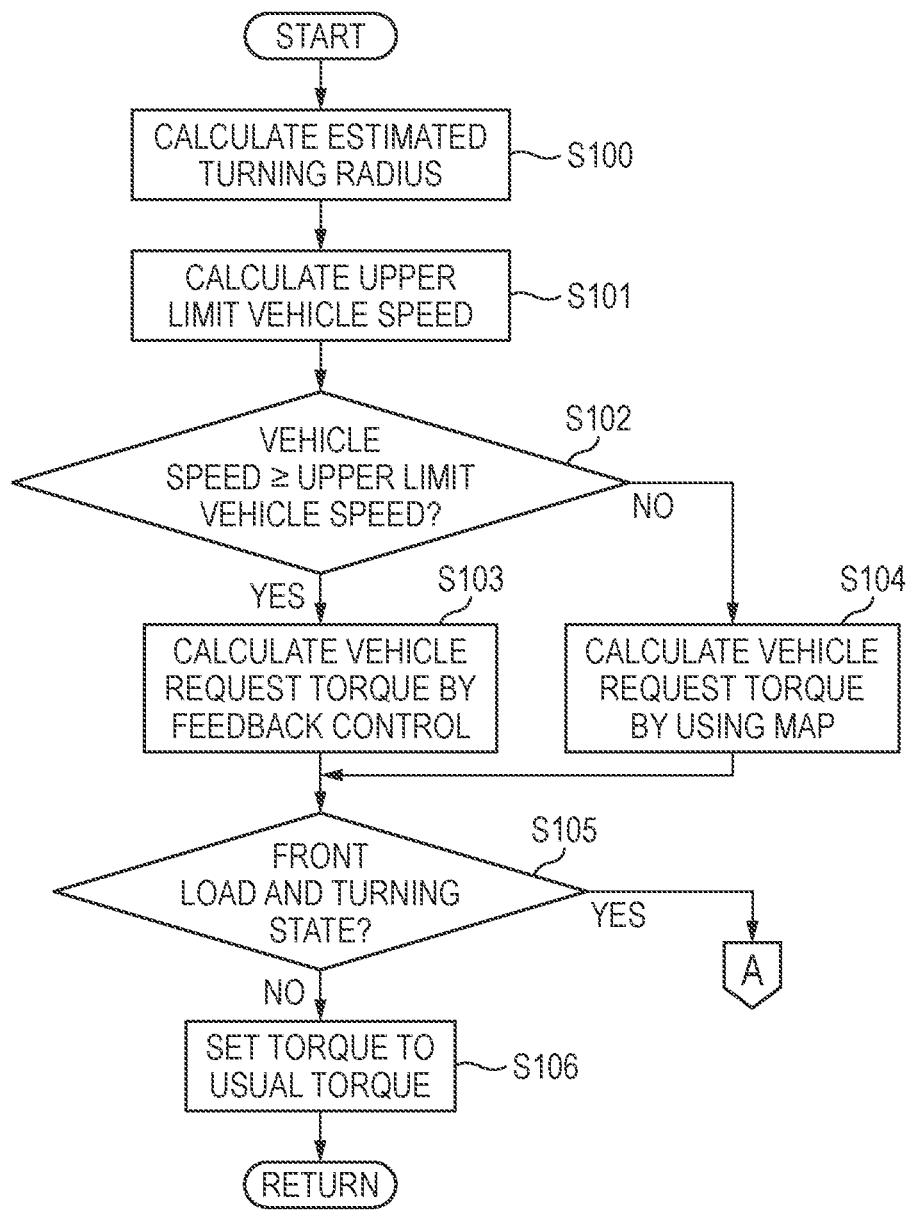
FIG. 12A is a flowchart for illustrating a sideslip prevention control of the embodiment of the second aspect.
Figure 12B:
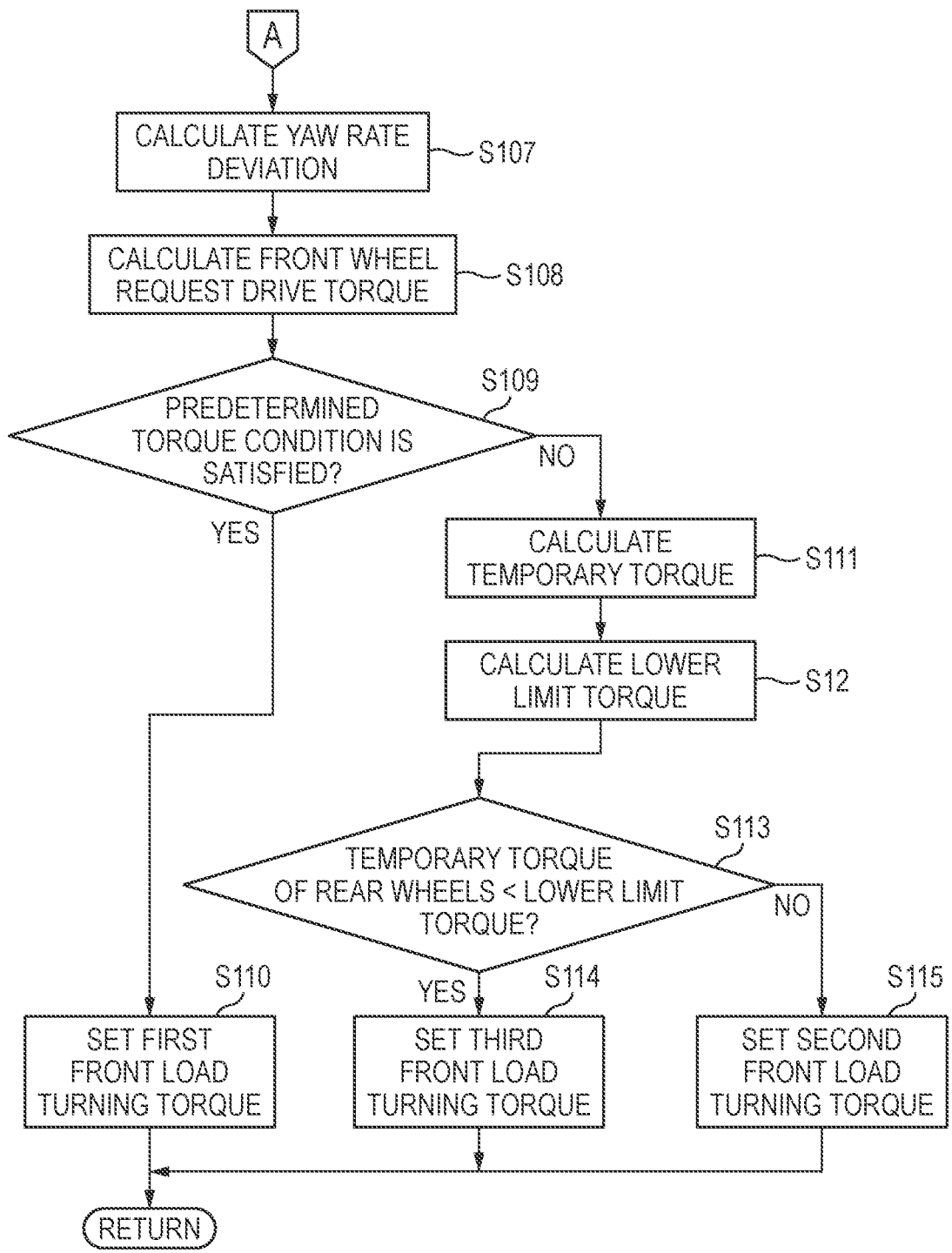
FIG. 12B is a flowchart for illustrating the sideslip prevention control of the embodiment of the second aspect.

Subsequently, the sideslip prevention control of the embodiment is described with reference to FIGS. 12A and 12B. FIGS. 12A and 12B are flowcharts for illustrating the sideslip prevention control of the embodiment.

The control device 10 calculates the estimated turning radius Rad (S100), and calculates the upper limit vehicle speed Spdlmt (S101). The control device 10 determines whether the vehicle speed Spd is equal to or greater than the upper limit vehicle speed Spdlmt (S102).

When it is determined that the vehicle speed Spd is equal to or greater than the upper limit vehicle speed Spdlmt (S102: Yes), the control device 10 calculates the vehicle request torque Cartrq by the feedback control based on the deviation between the vehicle speed Spd and the upper limit vehicle speed Spdlmt (S103). When it is determined that the vehicle speed Spd is smaller than the upper limit vehicle speed Spdlmt (S102: No), the control device 10 calculates the vehicle request torque Cartrq by using a map, for example, based on the vehicle speed Spd and the accelerator opening degree Accel (S104).

The control device 10 determines whether the state of the vehicle C is the front load and turning state (S105). When it is determined that the state of the vehicle C is not the front load and turning state (S105: No), the control device 10 sets the torque of each of the motors 2 to the usual torque (S106).

When it is determined that the state of the vehicle C is the front load and turning state (S105: Yes), the control device 10 calculates the yaw rate deviation Delyaw (S107), and calculates the front wheel request drive torque (S108).

The control device 10 determines whether the state of the vehicle C satisfies the predetermined torque condition (S109). When it is determined that the state of the vehicle C satisfies the predetermined torque condition (S109: Yes), the control device 10 sets the torque of each of the motors 2 to the first front load turning torque (S110).

When it is determined that the state of the vehicle C does not satisfy the predetermined torque condition (S109: No), the control device 10 calculates the temporary torque Temtrq (S111). The control device 10 calculates the lower limit torque Rrtrqmn (S112).

The control device 10 determines whether the temporary torque TemtrqR of the rear wheels 1R is smaller than the lower limit torque Rrtrqmn (S113). When it is determined that the temporary torque TemtrqR of the rear wheels 1R is smaller than the lower limit torque Rrtrqmn (S113: Yes), the control device 10 sets the torque of each of the motors 2 to the third front load turning torque (S114).

When it is determined that the temporary torque TemtrqR of the rear wheels 1R is equal to or greater than the lower limit torque Rrtrqmn (S113: No), the control device 10 sets the torque of each of the motors 2 for each of the rear wheels 1R to the second front load turning torque (S115).

Subsequently, effects of the control device 10 of the embodiment are described.

The control device 10 is configured to control the vehicle C configured to rotate each of the four drive wheels 1 by each of the different motors 2. The control device 10 includes the control unit 11. The control unit 11 is configured to control the torques that are generated by the motors 2. When the state of the vehicle C is the front load state where the load to the front wheels 1F is greater that the load to the other drive wheels 1 and the vehicle C is in the turning state, the control unit 11 performs the first control of setting the torques of the motors 2 configured to rotate the front wheels 1F greater.

Thereby, the control device 10 can increase the front wheel traveling direction vertical component F2 of the drive force F1 on the front wheel 1F, and suppress the increase in the cornering force CF (slip angle SA) of the front wheel 1F. For this reason, the control device 10 can secure a margin until the cornering force CF reaches the maximum cornering force CFmax. Therefore, during the turning of the vehicle C, the control device 10 can prevent sideslip, and prevent understeer from occurring on the vehicle C.

The first control that is performed by the control unit 11 sets the torque of the motor 2 configured to rotate the front wheel 1F, based on the yaw rate deviation Delyaw that is the deviation between the target yaw rate Yawtag and the real yaw rate Yawreal of the vehicle C.

Thereby, the control device 10 can control accurately the drive torque of the motor 2 configured to rotate the front wheel 1F, based on the yaw rate of the vehicle C. For this reason, the control device 10 can further prevent the sideslip during the turning of the vehicle C. In addition, when the vehicle is in the front load state and the turning state, the control device 10 can stabilize traveling of the vehicle C by controlling accurately the drive torque of the motor 2 configured to rotate the front wheel 1F.

The first control that is performed by the control unit 11 sets the torque of the motor 2 configured to rotate the front wheel 1F greater as the load to the front wheels 1F is greater than the load to the rear wheels 1R.

Thereby, the control device 10 can secure a margin until the cornering force CF reaches the maximum cornering force CFmax. For this reason, the control device 10 can prevent the sideslip, and prevent the understeer from occurring on the vehicle C, during the turning of the vehicle C.

The first control that is performed by the control unit 11 is performed when the vehicle C is in the turn start state. Thereby, even when the vehicle C is at the start of turning at which the understeer is likely to occur, the control device 10 can prevent the understeer from occurring on the vehicle C.

The control unit 11 is configured to perform the second control of setting the torque of each of the motors 2 so that the vehicle speed Spd is equal to or smaller than the upper limit vehicle speed Spdlmt at which the centrifugal acceleration of the vehicle C is equal to or smaller than the upper limit centrifugal acceleration CNTYDNG.

Thereby, during the turning of the vehicle C, the control device 10 can suppress the centrifugal force F3 from increasing by limiting the vehicle speed Spd and can secure a margin until the cornering force CF reaches the maximum cornering force CFmax. For this reason, the control device 10 can further prevent the sideslip.

When the implementation conditions for the first control and the second control are all satisfied, the control unit 11 performs preferentially the first control, and causes the motor 2 configured to rotate the rear wheel 1R to generate the braking torque in the second control.

Thereby, the control device 10 can increase the front wheel traveling direction vertical component F2 of the drive force F1 on the front wheel 1F, can suppress the increase in centrifugal force F3 by limiting the vehicle speed Spd by the braking torque of the rear wheel 1R, and can secure a margin until the cornering force CF of the front wheel 1F reaches the maximum cornering force CFmax. For this reason, the control device 10 can further prevent the sideslip.

When performing the second control, if the braking torque of limiting the vehicle speed Spd to the upper limit vehicle speed Spdlmt is smaller than the lower limit torque Rrtrqmn, the control unit 11 limits the braking torque of the motor 2 configured to rotate the rear wheel 1R to the lower limit torque Rrtrqmn. In addition, the control unit 11 limits the drive torque of the front wheel 1F in the first control, based on the limit amount of the braking torque of the motor 2 configured to rotate the rear wheel 1R.

Thereby, the control device 10 can prevent the sideslip while generating the maximum braking torque.

When the state of the vehicle C is the front load and turning state, the control device 10 of the embodiment calculates the front wheel request drive torque Frtrqrq by using the equation (7), based on the front wheel load ratio Frwigtrt. However, the present invention is not limited thereto. For example, the control device 10 of a modified embodiment may calculate the front wheel request drive torque Frtrqrq by using the equation (7), based on the front wheel load ratio Frwigtrt only upon start of the turning of the vehicle C.

For example, the control device 10 of a modified embodiment determines whether it is at the start of turning after step S107 of FIG. 12B, proceeds to step S108 when it is determined that it is at the start of turning, and calculates the front wheel request drive torque Frtrqrq by using the equation (7). When it is determined that it is not at the start of turning, the control device 10 of the modified embodiment sets the front wheel request drive base torque BASETRQ, as the front wheel request drive torque Frtrqrq. When the yaw rate deviation Delyaw is greater than a predetermined deviation, for example, the control device 10 of the modified embodiment determines that it is at the start of turning. The control device 10 may determine that it is at the start of turning, based on an amount of change in steering angle θ at a predetermined time. For example, when the amount of change in steering angle θ is greater than a predetermined value, the control device 10 determines that it is at the start of turning.

Thereby, only when it is a situation where the sideslip is likely to occur on the vehicle C, the control device 10 of the modified embodiment sets the front wheel request drive torque Frtrqrq based on the front wheel load ratio Frwigtrt, and controls the torque by using the front wheel request drive torque Frtrqrq. For this reason, the control device 10 of the modified embodiment can generate the torque on each of the drive wheels 1 according to the situation of the vehicle C, thereby suppressing the driver from feeling discomfort.

The control device 10 of the embodiment calculates the upper limit vehicle speed Spdlmt, based on the estimated turning radius Rad and the upper limit centrifugal acceleration CNTYDNG. Instead, the control device 10 of a modified embodiment may detect the centrifugal acceleration applied in a lateral direction of the vehicle C by the G sensor, and calculate the upper limit vehicle speed Spdlmt, based on the estimated turning radius Rad and the detected centrifugal acceleration applied in the lateral direction of the vehicle C. That is, the upper limit vehicle speed Spdlmt is calculated with respect to the centrifugal acceleration applied in the lateral direction of the current vehicle C.

In a case where a steering device of the vehicle C is a steer-by-wire system and the vehicle speed Spd is limited to the upper limit vehicle speed Spdlmt, the control on the torque of each of the motors 2 may be started before the steering angle θ of the front wheel 1F is adjusted by an actuator. Note that, a control delay of the actuator with respect to the operation on the steering 5 is set so that the driver does not feel the delay of the turning motion of the vehicle C.

Thereby, before the steering angle of the drive wheel 1 is actually changed, the control on the vehicle speed Spd is started, so that it is possible to suppress the sideslip from occurring on the vehicle C.

The control device 10 of a modified embodiment may execute the sideslip prevention control during the turning, irrespective of whether the vehicle C is in the front load state. In this case, the control device 10 sets the torque of each of the motors 2 during the turning so that the vehicle speed Spd is equal to or smaller than the upper limit vehicle speed Spdlmt at which the centrifugal acceleration of the vehicle C corresponds to the upper limit centrifugal acceleration CNTYDNG.

In the embodiment, the distribution of the left and right torque on the front wheels 1F and the distribution of the left and right torque on the rear wheels 1R are equally divided. However, the present invention is not limited thereto. For example, the distribution amounts on the left and right drive wheels 1 may be set different. For example, the distribution amount on the drive wheels 1 on an outer side with respect to the turning may be set larger than the distribution amount on the drive wheels 1 on an inner side with respect to the turning.

In the embodiment, the vehicle C having the four drive wheels 1 has been described as an example. However, a vehicle C having more than four drive wheels 1 is provided with three or more drive wheels 1 so as to be arranged in the front and rear direction on one side of the vehicle C in the right and left direction, for example. The plurality of drive wheels 1 may also be arranged in the right and left direction on one side of the vehicle C in the right and left direction.

In this case, for example, the control device 10 is configured to control only two torques of torque of the outermost and forefront front wheel 1F and torque of the innermost and rearmost rear wheel 1R. For example, the control device 10 is also configured to control torques of the drive wheels 1 other than the outermost and rearmost rear wheel 1R and the innermost and forefront front wheel 1F. For example, the control device 10 is also configured to group the wheels into the front wheels 1F and the rear wheels 1R depending on whether the wheels are in front of or at the rear of a center of the vehicle C, to group the wheels into the left wheels and the right wheels depending on whether the wheels are at the left or at the right of a center of the vehicle C and to control torque of the drive wheel 1 belonging to each group.

Note that, in the embodiment, the sideslip prevention control that is executed before the sideslip occurs has been described. However, when the vehicle C turns, sideslip suppression control of suppressing occurrence of the sideslip may also be executed after the sideslip occurs. That is, the control device 10 may execute the sideslip prevention control, and may execute the sideslip suppression control when the sideslip occurs. In addition, some of the sideslip suppression control may be applied to the vehicle C configured to perform automatic driving.

The above descriptions relate to the embodiment of the second aspect for controlling the vehicle so that the oversteer or the understeer does not occur during turning of the vehicle. The vehicle control device and the control method of the present invention may adopt only the first aspect of the present invention or may adopt both the first aspect of the present invention and the second aspect. In the control where both the first aspect of the present invention and the second aspect are adopted, when the vehicle is in the turning state, the prevention control of the second aspect is performed, and when the oversteer or the understeer has occurred even though the prevention control is performed, the return aspect of the first aspect is performed.

By the vehicle control device and the control method wherein only the second aspect is adopted and the first aspect of the present invention is not adopted, it is also possible to prevent the oversteer or the understeer from occurring during turning of the vehicle.

Examples of the configuration of the second aspect are described as follows.

[1] A vehicle control device configured to control a vehicle configured to rotate each of a plurality of drive wheels by each of different motors, the vehicle control device including:

a motor control unit configured to control torques that are generated by the motors, wherein when a state of the vehicle is a front load state where a load to front wheels is greater than a load to other drive wheels and the vehicle is in a turning state, the motor control unit performs a first control of setting torques of the motors configured to rotate the front wheels greater.

[2] The vehicle control device according to the above [1], wherein the first control that is performed by the motor control unit sets the torques of the motors configured to rotate the front wheels, based on a deviation between a target yaw rate and a real yaw rate of the vehicle.

[3] The vehicle control device according to the above [1] or [2], wherein the first control that is performed by the motor control unit sets the torques of the motors configured to rotate the front wheels greater as a load to the front wheels is greater than a load to rear wheels.

[4] The vehicle control device according to any one of the above [1] to [3], wherein the first control that is performed by the motor control unit is performed when the vehicle is in a turning start state.

[5] The vehicle control device according to any one of the above [1] to [4], wherein the motor control unit is configured to perform a second control of setting the torque of each of the motors so that a vehicle speed is equal to or smaller than an upper limit vehicle speed at which a centrifugal acceleration of the vehicle corresponds to an upper limit centrifugal acceleration.

[6] The vehicle control device according to the above [5], wherein when implementation conditions for the first control and the second control are all satisfied, the motor control unit performs preferentially the first control, and causes the motors configured to rotate rear wheels to generate braking torques in the second control.

[7] The vehicle control device according to the above [6], wherein when performing the second control, if braking torque of limiting the vehicle speed to the upper limit vehicle speed is smaller than lower limit torque, the motor control unit limits the braking torques of the motors configured to rotate the rear wheels to the lower limit torque, and limits drive torques of the front wheels in the first control, based on a limit amount of the braking torques of the motors configured to rotate the rear wheels.

[8] A control method of controlling a vehicle configured to rotate each of a plurality of drive wheels by each of different motors, the control method including:

when a state of the vehicle is a front load state where a load to front wheels is greater than a load to other drive wheels and the vehicle is in a turning state, performing a first control of setting torques of the motors configured to rotate the front wheels greater.

The additional effects and modified embodiments can be easily conceived by one skilled in the art. For this reason, the wider aspects of the present invention are not limited to the specific detailed and representative embodiments as described above. Therefore, a variety of changes can be made without departing from the spirit or scope of the concepts of the collective invention defined by the claims and equivalents thereof.

What is claimed is:

1. A vehicle control device configured to control a vehicle configured to rotate each of four or more drive wheels by each of different motors, the vehicle control device comprising:
    a motor control unit configured to control torques that are generated by the motors,
    wherein when oversteer has occurred during turning of the vehicle, the motor control unit performs a control upon oversteer of causing the motor configured to rotate a front wheel on an outer side with respect to the turning to generate braking torque, increasing drive torque of the motor configured to rotate a rear wheel on an inner side with respect to the turning, and decreasing drive torque of the motor configured to rotate a rear wheel on an outer side with respect to the turning.

2. The vehicle control device according to claim 1, wherein an occurrence direction of a real yaw rate of the vehicle is determined to be inverted, the motor control unit ends the control upon oversteer.

3. The vehicle control device according to claim 1, wherein when a counter operation is performed by a driver during the control upon oversteer, the motor control unit performs a control upon counter operation of reducing the braking torque.

4. The vehicle control device according to claim 3, wherein during the control upon counter operation, the motor control unit causes the drive torque to be generated preferentially by the motors configured to rotate steered wheels of the drive wheels.

5. The vehicle control device according to claim 1, wherein when the understeer has occurred during turning of the vehicle, the motor control unit performs a control upon understeer of causing the motor configured to rotate a rear wheel on an inner side with respect to the turning to generate braking torque and increasing drive torque of the motor configured to rotate a front wheel on an outer side with respect to the turning.

6. The vehicle control device according to claim 5, wherein the motor control unit is configured to determine whether to end the control upon oversteer, based on an occurrence direction of a real yaw rate of the vehicle, and to determine whether to end the control upon understeer, based on a deviation between a target yaw rate of the vehicle and a real yaw rate of the vehicle.

7. The vehicle control device according to claim 1, wherein when a state of the vehicle is a front load state where a load to front wheels is greater than a load to other drive wheels and the vehicle is in a turning state, the motor control unit performs a first control of setting torques of the motors configured to rotate the front wheels greater.

8. The vehicle control device according to claim 7, wherein the first control that is performed by the motor control unit sets the torques of the motors configured to rotate the front wheels, based on a deviation between a target yaw rate and a real yaw rate of the vehicle.

9. The vehicle control device according to claim 7, wherein the first control that is performed by the motor control unit sets the torques of the motors configured to rotate the front wheels greater as a load to the front wheels is greater than a load to rear wheels.

10. The vehicle control device according to claim 7, wherein the first control that is performed by the motor control unit is performed when the vehicle is in a turning start state.

11. The vehicle control device according to claim 7, wherein the motor control unit is configured to perform a second control of setting the torque of each of the motors so that a vehicle speed is equal to or smaller than an upper limit vehicle speed at which a centrifugal acceleration of the vehicle corresponds to an upper limit centrifugal acceleration.

12. The vehicle control device according to claim 11, wherein when implementation conditions for the first control and the second control are all satisfied, the motor control unit performs preferentially the first control, and causes the motors configured to rotate rear wheels to generate braking torques in the second control.

13. The vehicle control device according to claim 12, wherein when performing the second control, in a case where braking torque of limiting the vehicle speed to the upper limit vehicle speed is smaller than lower limit torque, the motor control unit limits the braking torques of the motors configured to rotate the rear wheels to the lower limit torque, and limits drive torques of the front wheels in the first control, based on a limit amount of the braking torques of the motors configured to rotate the rear wheels.

14. A vehicle control device configured to control a vehicle configured to rotate each of four or more drive wheels by each of different motors, the vehicle control device comprising:
    a motor control unit configured to control torques that are generated by the motors,
    wherein when understeer has occurred during turning of the vehicle, the motor control unit performs a control upon understeer of causing the motor configured to rotate a rear wheel on an inner side with respect to the turning to generate braking torque, increasing drive torque of the motor configured to rotate a front wheel on an outer side with respect to the turning, and decreasing drive torque of the motor configured to rotate a front wheel on an inner side with respect to the turning.

15. The vehicle control device according to claim 14, wherein when a deviation between a target yaw rate of the vehicle and a real yaw rate of the vehicle is determined to become equal to or smaller than a predetermined threshold value, the motor control unit ends the control upon understeer.

16. The vehicle control device according to claim 1, wherein when at least one of oversteer and understeer has occurred during turning of the vehicle, the motor control unit reduces drive torques of the motor configured to rotate a front wheel on an inner side with respect to the turning and the motor configured to rotate a rear wheel on an outer side with respect to the turning.

17. The vehicle control device according to claim 1, wherein, in a case where the motor control unit generates the braking torque when oversteer has occurred during turning of the vehicle, the motor control unit adjusts the drive torque so that a summed value of the braking torque and the drive torque does not exceed a request torque to the vehicle.

18. The vehicle control device according to claim 1, wherein when at least one of oversteer and understeer has occurred during turning of the vehicle, the motor control unit returns to a usual control in a case where a brake pedal is depressed by a driver.

19. A control method of controlling a vehicle configured to rotate each of four or more drive wheels by each of different motors, the control method comprising:
when oversteer has occurred during turning of the vehicle, causing the motor configured to rotate a front wheel on an outer side with respect to the turning to generate braking torque, increasing drive torque of the motor configured to rotate a rear wheel on an inner side with respect to the turning, and decreasing drive torque of the motor configured to rotate a rear wheel on an outer side with respect to the turning.

20. A control method of controlling a vehicle configured to rotate each of four or more drive wheels by each of different motors, the control method comprising:
when understeer has occurred during turning of the vehicle, causing the motor configured to rotate a rear wheel on an inner side with respect to the turning to generate braking torque, increasing drive torque of the motor configured to rotate a front wheel on an outer side with respect to the turning, and decreasing drive torque of the motor configured to rotate a front wheel on an inner side with respect to the turning.

21. The vehicle control device according to claim 1, wherein when oversteer has occurred during turning of the vehicle, the motor control unit performs a control of causing the motor configured to rotate a front wheel on an inner side with respect to the turning to generate drive torque.

22. The vehicle control device according to claim 1, wherein when the oversteer has occurred during turning of the vehicle, the motor control unit performs the control upon oversteer of causing the motor configured to rotate only the front wheel on an outer side with respect to the turning to generate braking torque and increasing drive torque of the motor configured to rotate only the rear wheel on an inner side with respect to the turning.

23. The vehicle control device according to claim 14, wherein when the understeer has occurred during turning of the vehicle, the motor control unit performs the control upon understeer of causing the motor configured to rotate only the rear wheel on an inner side with respect to the turning to generate braking torque and increasing drive torque of the motor configured to rotate only the front wheel on an outer side with respect to the turning.

24. The vehicle control device according to claim 1, wherein when the oversteer has occurred during turning of the vehicle, the motor control unit performs the control upon oversteer of causing the motor configured to rotate the front wheel on the outer side with respect to the turning to generate braking torque to a predetermined amount, and when a counter operation is performed by a driver during the control upon oversteer, the motor control unit performs a control upon counter operation of reducing the braking torque below the predetermined amount.

25. The vehicle control device according to claim 14, wherein when the understeer has occurred during turning of the vehicle, the motor control unit performs the control upon understeer of causing the motor configured to rotate a rear wheel on an inner side with respect to the turning to generate braking torque to a predetermined amount, and when a counter operation is performed by a driver during the control upon oversteer, the motor control unit performs a control upon counter operation of reducing the braking torque below the predetermined amount.

\* \* \* \* \*